(12) United States Patent
Isobe et al.

(10) Patent No.: US 11,130,225 B2
(45) Date of Patent: Sep. 28, 2021

(54) WORKING DEVICE AND DOUBLE-ARM TYPE WORKING DEVICE

(71) Applicant: NTN CORPORATION, Osaka (JP)

(72) Inventors: Hiroshi Isobe, Iwata (JP); Kenzou Nose, Iwata (JP); Naoki Marui, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 148 days.

(21) Appl. No.: 16/402,909

(22) Filed: May 3, 2019

(65) Prior Publication Data

US 2019/0255699 A1    Aug. 22, 2019

Related U.S. Application Data

(63) Continuation of application No. PCT/JP2017/040329, filed on Nov. 8, 2017.

(30) Foreign Application Priority Data

Nov. 10, 2016 (JP) .............................. JP2016-219583

(51) Int. Cl.
*B25J 9/02* (2006.01)
*B25J 9/00* (2006.01)
(Continued)

(52) U.S. Cl.
CPC ............ *B25J 9/023* (2013.01); *B25J 9/0087* (2013.01); *B25J 9/02* (2013.01); *B25J 9/16* (2013.01);
(Continued)

(58) Field of Classification Search
CPC ... B25J 9/023; B25J 9/0087; B25J 9/02; B25J 17/02
See application file for complete search history.

(56) References Cited

U.S. PATENT DOCUMENTS 4,882,527 A    11/1989  Yakuyama et al.
6,154,972 A    12/2000  Otsubo
(Continued)

FOREIGN PATENT DOCUMENTS

CN    105598952 A    5/2016
CN    105722649 A    6/2016
(Continued)

OTHER PUBLICATIONS

English Translation by WIPO of the International Preliminary Report on Patentability dated May 23, 2019 in corresponding International Patent Application No. PCT/JP2017/040329 (10 pages).
(Continued)

*Primary Examiner* — Bobby Rushing, Jr.

(57) ABSTRACT

A working device includes: a linear motion unit having three degrees of freedom and obtained by combining three linear motion actuators; and a rotary unit having three degrees of freedom and obtained by combining a plurality of rotating mechanisms each having one or more rotational degrees of freedom. The linear motion unit is mounted on a mount such that a base portion of the linear motion unit is fixed to the mount. A base portion of the rotary unit is fixedly mounted on an output portion of the linear motion unit. End effectors are mounted on both the output portion of the linear motion unit and an output portion of the rotary unit.

12 Claims, 16 Drawing Sheets

(51) Int. Cl.
*B25J 9/16* (2006.01)
*B25J 17/02* (2006.01)
*B25J 21/00* (2006.01)

(52) U.S. Cl.
CPC .......... *B25J 17/02* (2013.01); *B25J 17/0283* (2013.01); *B25J 21/00* (2013.01)

(56) References Cited

U.S. PATENT DOCUMENTS

| | | | |
|---|---|---|---|
| 9,821,454 | B2 | 11/2017 | Isobe et al. |
| 2016/0256998 | A1 | 9/2016 | Isobe et al. |
| 2018/0093373 | A1 | 4/2018 | Niederberger |
| 2019/0047159 | A1 | 2/2019 | Isobe et al. |

FOREIGN PATENT DOCUMENTS

| | | |
|---|---|---|
| JP | 1-103279 | 4/1989 |
| JP | 2-147806 | 6/1990 |
| JP | 5-380 | 1/1993 |
| JP | 5-77175 A | 3/1993 |
| JP | 5-146979 | 6/1993 |
| JP | 7-91947 | 4/1995 |
| JP | 7-178684 | 7/1995 |
| JP | 8-10935 | 1/1996 |
| JP | 2000-35325 | 2/2000 |
| JP | 2005-329521 | 12/2005 |
| JP | 4528312 | 6/2010 |
| JP | 2016-147351 | 8/2016 |
| JP | 2017-193009 | 10/2017 |
| WO | 2016/129624 A1 | 8/2016 |
| WO | 2016/166116 A1 | 10/2016 |

OTHER PUBLICATIONS

Notice of Reasons for Refusal, dated May 26, 2020, in corresponding Japanese Patent Application No. 2016-219583 (10 pages).
Extended European Search Report, dated Jun. 17, 2020, in corresponding European Patent Application No. 17869324.8 (8 pages).
International Search Report dated Feb. 6, 2018 in corresponding International Application No. PCT/JP2017/040329.
Chinese Office Action dated Jul. 29, 2021, in Chinese Patent Application No. 201780068994.2 (13 pages including translation).

WORKING DEVICE AND DOUBLE-ARM TYPE WORKING DEVICE

CROSS REFERENCE TO THE RELATED APPLICATION

This application is a continuation application, under 35 U.S.C. § 111(a) of international patent application No. PCT/JP2017/040329, filed Nov. 8, 2017, which claims priority to Japanese patent application No. 2016-219583, filed Nov. 10, 2016, the entire disclosure of which is herein incorporated by reference as a part of this application.

BACKGROUND OF THE INVENTION

Field of the Invention

The present invention relates to a working device and a double-arm type working device for use in equipment that requires high-speed and high-accuracy work such as medical equipment and industrial equipment, equipment that requires fine work such as assembly, a robot coexisting with a person, etc.

Description of Related Art

Patent Documents 1 and 2, listed below, each propose an articulated robot type working device with six degrees of freedom. The working device of Patent Document 1 has a single-arm configuration, and the working device of Patent Document 2 has a double-arm type configuration. These working devices are each configured with six degrees of freedom as a whole by combining six mechanisms each having one rotational degree of freedom.

RELATED DOCUMENT

Patent Document

[Patent Document 1] JP Laid-open Patent Publication No. 2005-329521
[Patent Document 2] JP Patent No. 4528312

SUMMARY OF THE INVENTION

The working device of Patent Document 1 is configured by a combination of the mechanisms, all of which have one rotational degree of freedom, and thus has the following problems.

In the case of slightly changing the posture of an end effector mounted on a distal end or in the case of linearly moving such an end effector, it is necessary to drive a plurality of motors in a cooperative manner, and thus, it is impossible to perform fine work at a high speed.

Even in the case of slightly changing the posture of the end effector, not only a movement amount of a wrist joint (a joint near the end effector) but also a movement amount of an arm (a part away from the end effector) is increased. Therefore, a part of the working device is likely to come into contact with an object around the working device. In order to completely avoid such contact, it is necessary to provide a large enclosure, and thus the occupation area becomes wide.

There are a plurality of paths for reaching one posture of the end effector in some cases, and thus, it is hard to imagine in which direction the distal end of the end effector moves even when an arm is moved about the rotation axis thereof when teaching. Therefore, knowledge and experience are needed to perform manipulations.

Since the range of movement is wide, it is necessary to assume coming into contact with a person or an object and to enhance a contact prevention function, and therefore, the entire device becomes expensive.

In order to avoid contact with a person or an object, it is necessary to perform work at a reduced operation speed, or to perform work, at power less than the ability, even in an operation range, and therefore, the ability cannot be fully realized.

Even in the case where the contact prevention function is enhanced, an operator minds coming into contact with the working device, and therefore, it is difficult for a person and the working device to coexist.

The working device of Patent Document 2 has the same problems as those of the working device of Patent Document 1. In addition, the working device of Patent Document 2, which is of a double-arm type, has the following problems.

Since the range of movement of each arm is wide, a region where the arms interfere with each other is also wide. Knowledge and experience are needed to perform operation such that the arms do not come into contact with each other.

Since two arms having a wide range of movement are provided, the occupation area becomes even wider when an enclosure is provided.

In order to solve the above problems, a working device has been suggested in which the position and the angle of an end effector are changed relative to a workpiece by a linear motion unit having three degrees of freedom and a rotary unit having three degrees of freedom (JP Laid-open Patent Publication No. 2017-193009). With such a working device as suggested, an operation amount of the entire device, when performing fine work, can be reduced, and the reliability of operation is high. Therefore, the working device can coexist with a person, and work that is close to manual work performed by a person can be automatically performed.

In order to further improve the accuracy and efficiency of work, mounting a plurality of end effectors on one working device is considered. With the above suggested working device or when a plurality of end effectors are merely mounted on the working device disclosed in Patent Document 1 or Patent Document 2, the following problem arises. Specifically, even when two end effectors are mounted on an output portion defined at a distal end of the working device or on an output portion of each joint, the two end effectors move merely in the same manner. That is, works having characteristics different from each other cannot be performed. In particular, work in which only linear motion is made cannot be performed.

An object of the present invention is to provide a working device that can reduce an operation amount of the entire device when performing fine work, has high reliability in operation, can coexist with a person, can automatically perform work that is close to manual work performed by a person, can perform many types of work at a high speed, and can improve productivity. Another object of the present invention is to provide a double-arm type working device that can perform work that is work performed by a person with both hands.

A working device of the present invention has six degrees of freedom and is configured to perform work using end effectors, the working device including: a linear motion unit having three degrees of freedom and obtained by combining three linear motion actuators; and a rotary unit having three degrees of freedom and obtained by combining a plurality of rotating mechanisms each having one or more rotational degrees of freedom, wherein the linear motion unit is mounted on a mount such that a base portion thereof is fixed to the mount, a base portion of the rotary unit is fixedly mounted on an output portion of the linear motion unit, and the end effectors are mounted on both the output portion of the linear motion unit and an output portion of the rotary unit.

According to this configuration, positions of the end effectors are determined by the linear motion unit having three degrees of freedom, and a posture of the end effector is determined by the rotary unit having three degrees of freedom. The respective linear motion actuators of the linear motion unit and the respective rotating mechanisms of the rotary unit respectively correspond to the positions of the end effector represented in a rectangular coordinate system and the posture of the end effector represented in a polar coordinate system. Therefore, operations of the respective linear motion actuators and the respective rotating mechanisms with respect to the position and the posture of each end effector are easily imagined, and therefore, operation patterns for posture teaching work and the like are easily set. In addition, operating positions of the respective linear motion actuators and operating angles of the respective rotating mechanisms are uniquely determined with respect to the position and the posture of each end effector. That is, there is no singular point. Due to this, the working device can be manipulated even without proficient knowledge and experience.

The end effector mounted on the output portion of the linear motion unit is used for work that is performed through operation only with linear motion. In addition, the end effector mounted on the output portion of the rotary unit is used for work that is performed through operation with a combination of linear motion and rotary motion. Since the multiple end effectors that perform different works are mounted on the one working device as described above, each of a plurality of works can be performed using an end effector suited for the characteristics of the work. Accordingly, the accuracy and efficiency of work can be improved. For example, work for picking and placing a component, work for inserting or press-fitting a component, etc., can be performed through operation only with linear motion.

Generally, in the case where a plurality of joints are arranged in series, a load such as the joints closer to a distal end is applied to drive sources for moving the joints located closer to a base, and thus, drive sources having a larger capacity than drive sources for moving the joints located closer to the distal end are used as the drive sources for moving the joints located closer to the base. In the working device of the present invention, since the rotary unit is mounted on the output portion of the linear motion unit, a drive source of the linear motion unit has a larger capacity than a drive source of the rotary unit. That is, the weight capacity of the output portion of the linear motion unit is larger than that of the output portion of the rotary unit. Thus, the end effector mounted on the linear motion unit can perform work having a relatively large load, for example, a press-fitting work, etc.

Additionally, the following operation and advantageous effects are achieved.

In the case of performing fine work such as assembling work, the work can be performed mainly by moving only the rotary unit. Thus, since an operation amount of the linear motion unit can be reduced, the range of movement of the entire device can be reduced, and the reliability is high. In addition, the area in which it is necessary to install a protective measure such as an enclosure can be decreased.

Since the linear motion actuators are used in a portion that greatly influences the range of movement, the operation range can be easily limited by using a mechanical stopper, a limit sensor, or the like in accordance with work contents or the ambient environment.

Since the linear motion unit and the rotary unit are separately provided, it is possible to change only either unit in the case of changing the specifications of the working device. Accordingly, components can be shared by working devices having different specifications.

Since the positions of the end effectors are determined by the linear motion actuators, linear motions of the end effectors can be accurately made at a high speed.

An enclosure such as a protective cover having a simple shape such as a rectangular parallelepiped shape can be installed. In this case, the volume of the internal space of the enclosure and the volume of the region where movable portions move are substantially equal to each other. Thus, a compact configuration can be achieved even when the protection device is included.

In the present invention, at least one of the plurality of rotating mechanisms of the rotary unit may be a link actuation device having two degrees of freedom. The link actuation device may include: a proximal end side link hub and a distal end side link hub coupled to the proximal end side link hub via three or more link mechanisms such that a posture of the distal end side link hub can be changed relative to the proximal end side link hub, each link mechanism may include: a proximal side end link member having one end rotatably coupled to the proximal end side link hub; a distal side end link member having one end rotatably coupled to the distal end side link hub; and an intermediate link member having opposite ends rotatably coupled to other ends of the proximal side and distal side end link members, respectively, and a posture control actuator configured to arbitrarily change the posture of the distal end side link hub relative to the proximal end side link hub may be provided to each of two or more link mechanisms of the three or more link mechanisms.

In the link actuation device, the proximal end side link hub, the distal end side link hub, and the three or more link mechanisms cooperate together to form a two-degrees-of-freedom mechanism in which the distal end side link hub is rotatable about two mutually orthogonal axes relative to the proximal end side link hub. This two-degrees-of-freedom mechanism is compact in size, but can achieve a wide range of movement for the distal end side link hub. For example, the maximum value of a bending angle between the central axis of the proximal end side link hub and the central axis of the distal end side link hub is about ±90°, and a turning angle of the distal end side link hub relative to the proximal end side link hub can be set in the range of 0° to 360°. In addition, in the operation range at a bending angle of 90° and a turning angle of 360°, smooth operation can be performed without any singular point.

By using the link actuation device which can smoothly operate in a wide range of movement as described above, fine work can be performed at a high speed. In addition, the link actuation device has a compact configuration but has a wide range of movement, and thus, the entire configuration of the working device becomes compact.

When a point, at which a central axis of each of revolute pairs between the proximal end side link hub and the proximal side end link members and a central axis of each of revolute pairs between the proximal side end link members and the intermediate link members intersect each other, is referred to as a proximal end side spherical link center, and a straight line, that passes through the proximal end side spherical link center and intersects the central axis of each of the revolute pairs between the proximal end side link hub and the proximal side end link members at a right angle, is referred to as a central axis of the proximal end side link hub, the multiple posture control actuators of the link actuation device may be rotary actuators and be disposed on a circumference of a virtual circle such that rotation output shafts of the rotary actuators are parallel to the central axis of the proximal end side link hub, rotational driving force of each rotation output shaft may be transmitted to the link mechanism via an axis-orthogonal type speed reducer, and another rotating mechanism for rotating the link actuation device about the central axis of the proximal end side link hub may be disposed at a center of arrangement of the respective posture control actuators. In this case, the configuration of the rotary unit becomes compact.

In the present invention, each of the linear motion actuators of the linear motion unit may have a stage that is composed of an advancing/retracting portion, and each of the stages may be disposed so as to be directed toward an outer side with respect to a working space in which work is performed by the respective end effectors. When the stages of the respective linear motion actuators are disposed so as to be directed toward the outer side with respect to the working space, the working space can be wide, and also, the protection function performed when a hand is put into the working space is enhanced.

A double-arm type working device of the present invention includes two working devices each of which is any of the working devices described above are aligned so as to be geometrically symmetrical with each other. When a double-arm type in which the two working devices are aligned is configured, it is possible to perform work that is performed with both hands by a person. Accordingly, work that is performed as a substitute for a person, in particular, work such as assembly of components, can be performed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described with reference to the drawings.

First Embodiment

Figure 1:
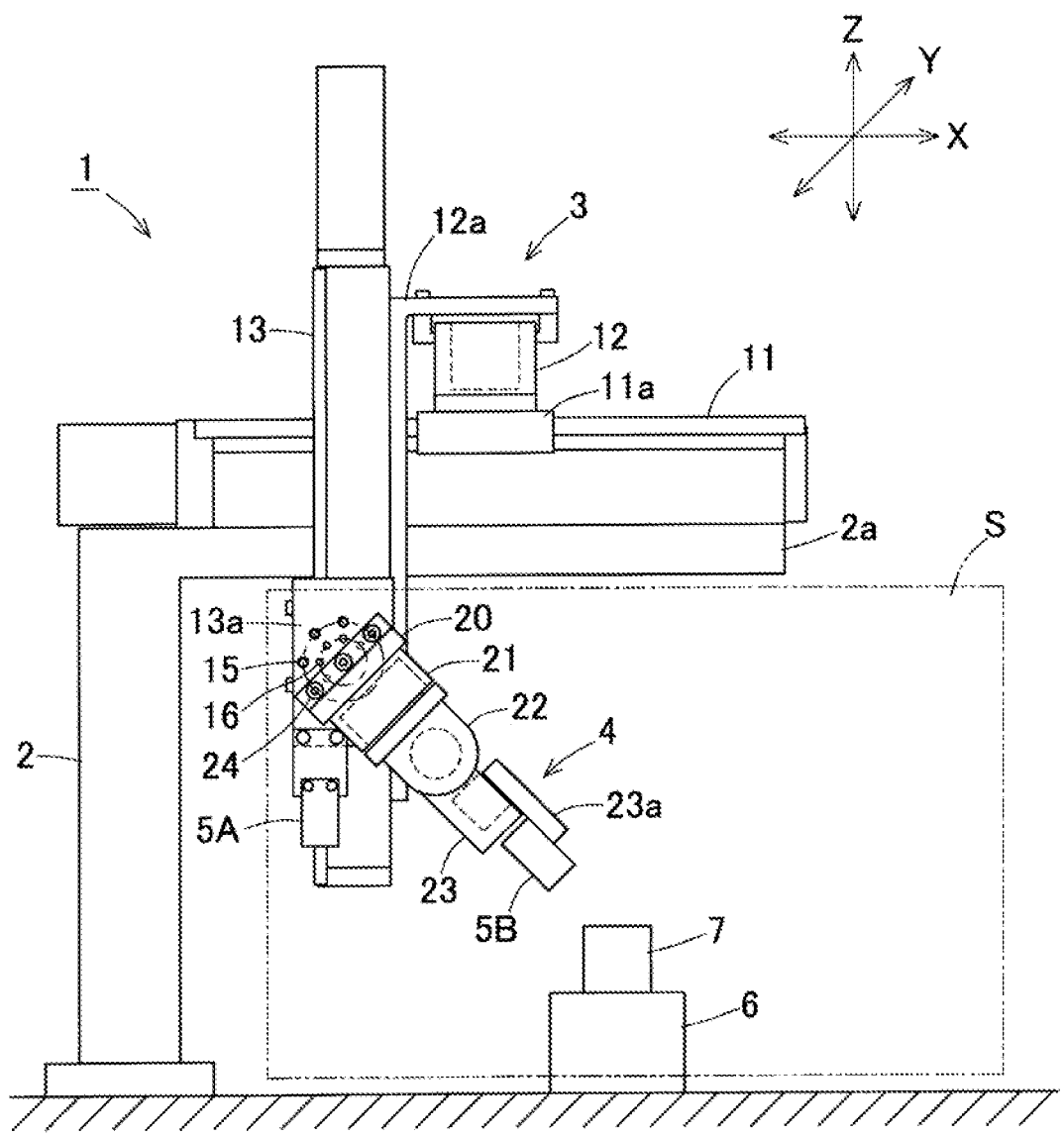
FIG. 1 is a front view showing a schematic configuration of a working device according to a first embodiment of the present invention.

FIG. 1 to FIG. 3B show a working device according to a first embodiment of the present invention. As shown in FIG. 1, the working device 1 includes: a mount 2; a linear motion unit 3 that is mounted on the mount 2 such that a base portion of the linear motion unit 3 is fixed to the mount 2; and a rotary unit 4 that is mounted on an output portion of the linear motion unit 3 such that a base portion of the rotary unit 4 is fixed to the output portion of the linear motion unit 3. End effectors 5A and 5B are mounted on both the output portion 13*a* of the linear motion unit 3 and an output portion 23*a* of the rotary unit 4.

The end effector 5A, which is mounted on the output portion 13*a* of the linear motion unit 3, is a working body used for work that is performed through operation only with linear motion. The end effector 5B, which is mounted on the output portion 23*a* of the rotary unit 4, is a working body used for work that is performed through operation with a combination of linear motion and rotary motion. These end effectors 5A and 5B perform work on a workpiece 7 placed on a workpiece placement table 6. The end effectors 5A and 5B may perform work on the workpiece 7 in a contact manner, or may perform work on the workpiece 7 in a non-contact manner. Work on the workpiece 7 by the end effectors 5A and 5B is performed within a working space S.

The linear motion unit 3 has a configuration with three degrees of freedom in which three linear motion actuators are combined. The rotary unit 4 has a configuration with three degrees of freedom in which a plurality of rotating mechanisms each having one or more rotational degrees of freedom are combined. Thus, the working device 1 has a configuration with six degrees of freedom as a whole.

Figure 2A:
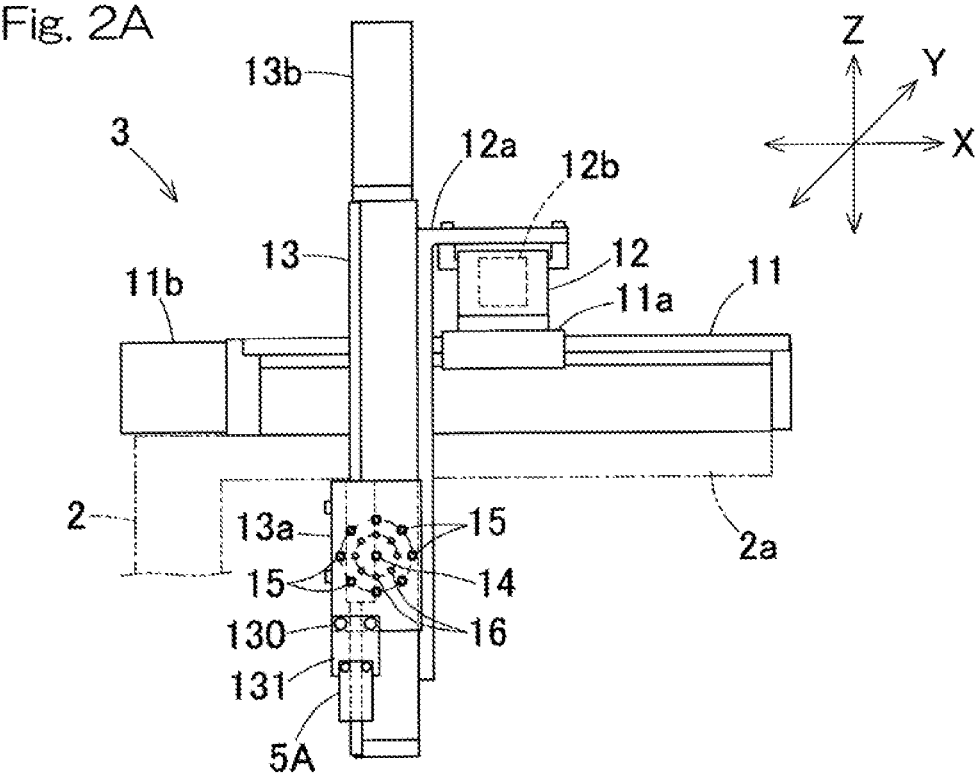
FIG. 2A is a front view of a linear motion unit of the working device.
Figure 2B:
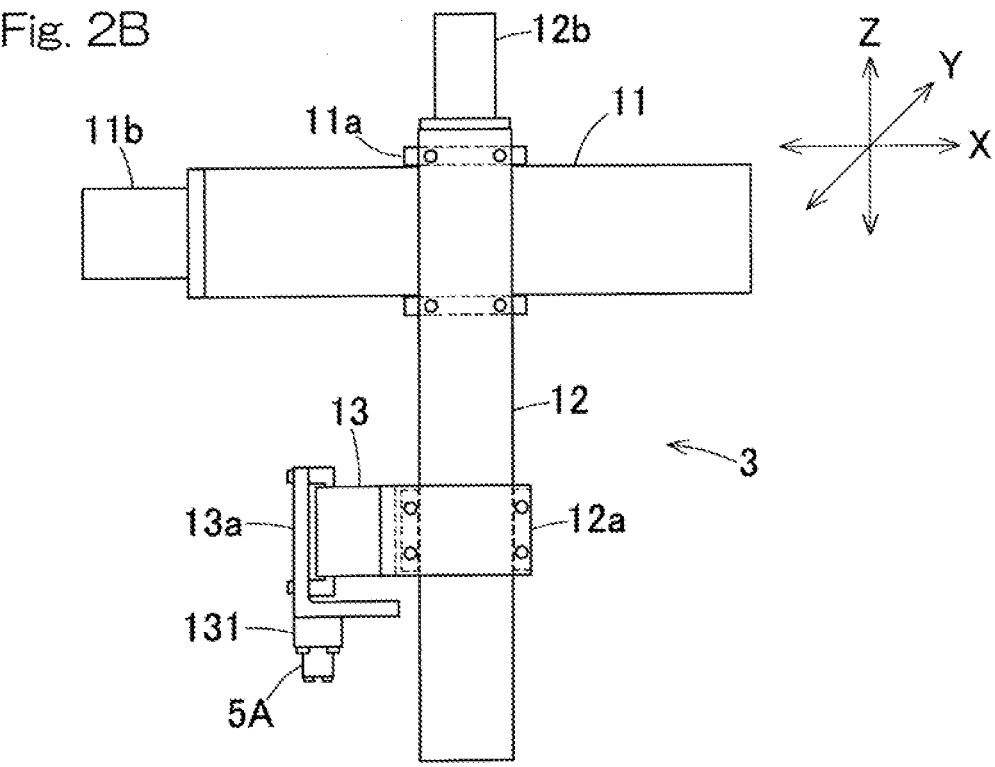
FIG. 2B is a plan view of the linear motion unit of the working device.

FIG. 2A is a front view of the linear motion unit 3, and FIG. 2B is a plan view of the linear motion unit 3. As shown in FIGS. 2A and 2B, the linear motion unit 3 includes a first linear motion actuator 11, a second linear motion actuator 12, and a third linear motion actuator 13. The first linear motion actuator 11 is mounted on a horizontal portion 2a of the mount 2, and includes a stage 11a which advances/retracts in the right-left direction (an X-axis direction). The second linear motion actuator 12 is mounted on the stage 11a of the first linear motion actuator 11, and includes a stage 12a which advances/retracts in the front-rear direction (a Y-axis direction). The third linear motion actuator 13 is mounted on the stage 12a of the second linear motion actuator 12, and the output portion 13a, which forms a stage of the third linear motion actuator 13, advances/retracts in the up-down direction or vertical direction (a Z-axis direction). The respective linear motion actuators 11, 12, and 13 are electric actuators having motors 11b, 12b, and 13b as drive sources. The respective linear motion actuators 11, 12, and 13 are disposed such that the stages 11a, 12a and the output portion (stage) 13a are directed toward the outer side with respect to the working space S.

The "base portion of the linear motion unit" refers to a portion, of the first linear motion actuator 11, that does not advance/retract, and this portion is fixed to the horizontal portion 2a of the mount 2. In addition, the "output portion of the linear motion mechanism" refers to the stage of the third linear motion actuator 13 in the present embodiment. The rotary unit 4 is mounted on the output portion 13a, which is the stage, and the end effector 5A is also mounted on the output portion 13a. Specifically, a working body fixing member 131 is fixed to the output portion 13a, which is the stage of the third linear motion actuator 13, by a connection fixing member 130, and the end effector 5A is fixed to the working body fixing member 131.

Figure 3A:
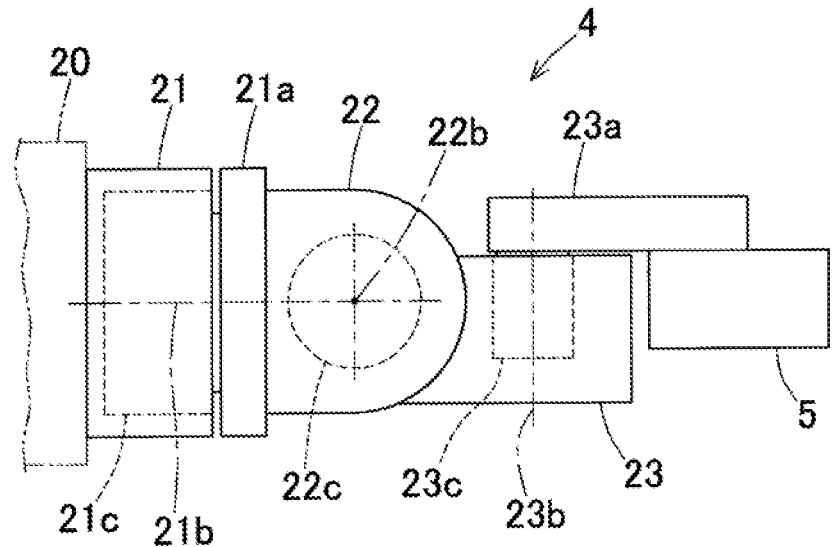
FIG. 3A is a front view of a rotary unit of the working device.
Figure 3B:
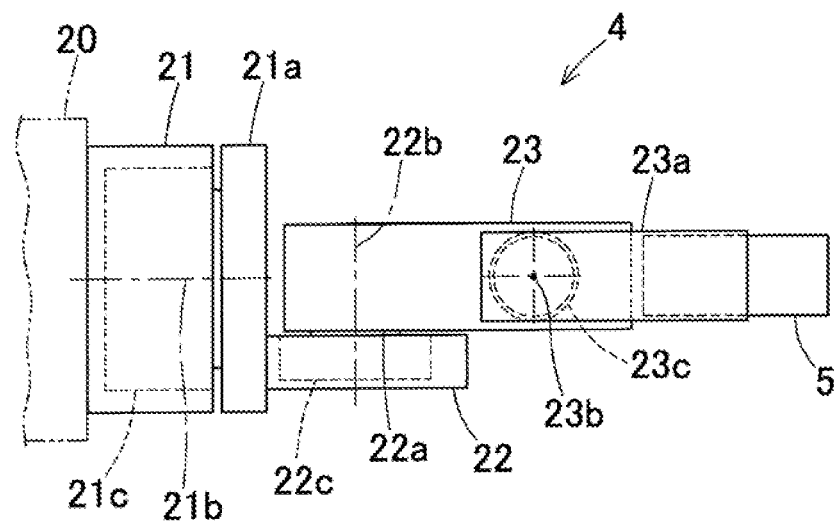
FIG. 3B is a plan view of the rotary unit of the working device.

FIG. 3A is a front view of the rotary unit 4, and FIG. 3B is a plan view of the rotary unit 4. As shown in FIGS. 3A and 3B, the rotary unit 4 includes: a rotary unit mounting member 20 that is fixed to the output portion of the linear motion unit 3 (see FIG. 1); a first rotating mechanism 21 that is mounted on the rotary unit mounting member 20; a second rotating mechanism 22 that is mounted on a rotating portion 21a of the first rotating mechanism 21; and a third rotating mechanism 23 that is mounted on a rotating portion 22a of the second rotating mechanism 22. The rotation axes 21b, 22b, and 23b of the first, second, third rotating mechanisms 21, 22, and 23 are orthogonal to each other. Rotational drive sources of the respective rotating mechanisms 21, 22 and 23 are, for example, motors 21c, 22c and 23c.

The "base portion of the rotary unit" refers to the rotary unit mounting member 20, and the rotary unit mounting member 20 is fixed to the output portion 13a, which is the stage of the third linear motion actuator 13. The "output portion of the rotary unit" refers to a rotating portion of the third rotating mechanism 23, and the end effector 5B is mounted on the output portion 23a, which forms a rotating portion of the third rotating mechanism 23. As shown in FIG. 2A, screw holes 14, 15 and a positioning hole 16 for fixing the rotary unit mounting member 20 are provided in the output portion 13a of the linear motion unit 3, which forms the stage of the third linear motion actuator 13. As for the screw hole 14, only one hole is provided at a center portion of an area to which the rotary unit mounting member 20 is fixed. As for the screw hole 15, a plurality of holes are arranged on the circumference of a circle centered at the screw hole 14 defined at the foregoing center portion. As for the positioning hole 16, holes, the number of which is equal to the number of the screw holes 15, are arranged on the circumference of a concentric circle that has a smaller diameter than that for the screw holes 15. The rotary unit mounting member 20 is provided with: three bolt insertion holes (not shown) that are aligned in a straight line corresponding to the screw holes 14 and 15; and two positioning projections (not shown) corresponding to the positioning holes 16.

For fixing the rotary unit mounting member 20 to the output portion 13a of the linear motion unit 3, the angle of the rotary unit mounting member 20 relative to the output portion 13a in a front view is determined by bringing the two positioning projections of the rotary unit mounting member 20 into engagement with the two positioning holes 16 of the stage 13a that oppose each other across the screw hole 14 defined at the foregoing center portion. In this state, as shown in FIG. 1, mounting bolts 24 are inserted into the three bolt insertion holes defined at the rotary unit mounting member 20, respectively, and thus, are screwed into the screw hole 14 defined at the center portion of the output portion 13a and the two screw holes 15 at both sides of the screw hole 14, thereby fixing the rotary unit mounting member 20 to the output portion 13a. The mounting angle of the base portion of the rotary unit 4 relative to the output portion 13a of the linear motion unit 3 can be changed by changing the two positioning holes 16 of the output portion 13a with which the two positioning projections of the rotary unit mounting member 20 are brought into engagement.

[Operation]

Operation of the working device 1 will be described. According to this configuration, positions of the end effectors 5A and 5B are determined mainly by the linear motion unit 3 having three degrees of freedom, and a posture of the end effector 5B is determined by the rotary unit 4 having three degrees of freedom. Operating positions of the respective linear motion actuators 11, 12, and 13 of the linear motion unit 3 correspond to the positions of the end effectors 5A and 5B represented in a rectangular coordinate system, and operating positions of the respective rotating mechanisms 21, 22, and 23 of the rotary unit 4 correspond to the posture of the end effector 5B represented in a polar coordinate system. Thus, operations of the respective linear motion actuators 11, 12, and 13 and the respective rotating mechanisms 21, 22, and 23 with respect to the positions of the end effectors 5A and 5B and the posture of the end effector 5B are easily imagined, and therefore, operation patterns for posture teaching work and the like are easily set.

Operating positions of the respective linear motion actuators 11, 12, and 13 and operating angles of the respective rotating mechanisms 21, 22, and 23 are uniquely determined with respect to the positions of the end effectors 5A and 5B and the posture of the end effector 5B. That is, there is no singular point. Due to this, it is easily imagined in which direction the distal end of the end effector 5B moves when an arm is moved about a rotation axis thereof during teaching. Therefore, the working device 1 can be manipulated even without proficient knowledge and experience.

The end effector 5A, which is mounted on the output portion 13a of the linear motion unit 3, is used for work that is performed through operation only with linear motion. The end effector 5B, which is mounted on the output portion 23a of the rotary unit 4, is used for work that is performed through operation with a combination of linear motion and rotary motion. Since the two end effectors 5A and 5B, which perform different works, are mounted on the one working device 1 as described above, each of a plurality of works can be performed using an end effector suited for the characteristics of the work. Accordingly, the accuracy and efficiency of work can be improved. For example, work for picking and placing a component, working for inserting or press-fitting a component, etc., can be performed through operation only with linear motion.

Generally, in the case where a plurality of joints are arranged in series, a load such as the joints closer to a distal end is applied to drive sources for moving the joints located closer to a base, and thus, drive sources having a larger capacity than drive sources for moving the joints located closer to the distal end are used as the drive sources for moving the joints located closer to the base. In the working device 1, since the rotary unit 4 is mounted on the output portion 13a of the linear motion unit 3, the respective motors 11b, 12b, and 13b of the linear motion unit 3 have a larger capacity than the motors 21c, 22c, and 23c of the rotary unit 4. That is, the weight capacity of the output portion 13a of the linear motion unit 3 is larger than that of the output portion 23a of the rotary unit 4. Thus, the end effector 5A, which is mounted on the linear motion unit 3, can perform work having a relatively large load, for example, a press-fitting work, etc.

In the case of performing fine work such as assembling work on the workpiece 7 by using the end effector 5B, the work can be performed mainly by moving only the rotary unit 4. Thus, since an operation amount of the linear motion unit 3 can be reduced, the range of movement of the entire device can be reduced, and the reliability is high. In addition, the area in which it is necessary to install a protective measure such as an enclosure can be decreased.

Since the positions of the end effectors 5A and 5B are determined by the linear motion actuators 11, 12 and 13, linear motions of the end effectors 5A and 5B can be accurately made at a high speed. In addition, since the linear motion actuators 11, 12, and 13 are used in a portion that greatly influences the range of movement, the operation range can be easily limited by using a mechanical stopper, a limit sensor, or the like in accordance with work contents or the ambient environment.

Since the respective linear motion actuators 11, 12, and 13 of the linear motion unit 3 are disposed so as to be directed toward the outer side with respect to the working space S, the working space S can be wide. In addition, the protection function performed, for example, when a hand is put into the working space S, is enhanced.

Since the linear motion unit 3 and the rotary unit 4 are separately provided, it is possible to change only either unit in the case of changing the specifications of the working device 1. For example, the rotary unit 4 can be changed from the form shown in FIGS. 3A and 3B to a form shown in FIG. 5 described later, a form shown in FIG. 12 described later, a form shown in FIG. 14 described later, or the like. Accordingly, components can be shared by working devices 1 having different specifications.

The rotary unit mounting member 20, which forms the base portion of the rotary unit 4, is mounted on the stage of the third linear motion actuator 13, which forms the output portion 13a of the linear motion unit 3, by the mounting bolts 24 such that the mounting angle of the rotary unit mounting member 20 can be changed. Thus, the device configuration can be easily changed in accordance with work contents or the ambient environment.

As described above, when the working device 1 performs fine work, an operation amount of the entire device is small. Thus, the reliability of operation is high, and the working device 1 can coexist with a person. That is, work that is close to manual work performed by a person can be automatically performed. In addition, since a plurality of the end effectors 5A and 5B are mounted, it is possible to shorten a set-up change time and an adjustment time, high-speed operation can be performed, and many types of work can be performed. Thus, productivity can be improved.

In the case where the working device 1 and a person coexist, it is desirable to install an enclosure such as a protective cover (not shown) for covering the working device 1. Since the range of movement of the working device 1 is determined mainly by the linear motion actuators 11, 12, and 13, the enclosure can have a simple shape such as a rectangular parallelepiped shape. In this case, the volume of the internal space of the enclosure and the volume of the region where movable portions move are substantially equal to each other. Thus, a compact configuration can be achieved even when the protection device is included.

Second Embodiment

Figure 4:
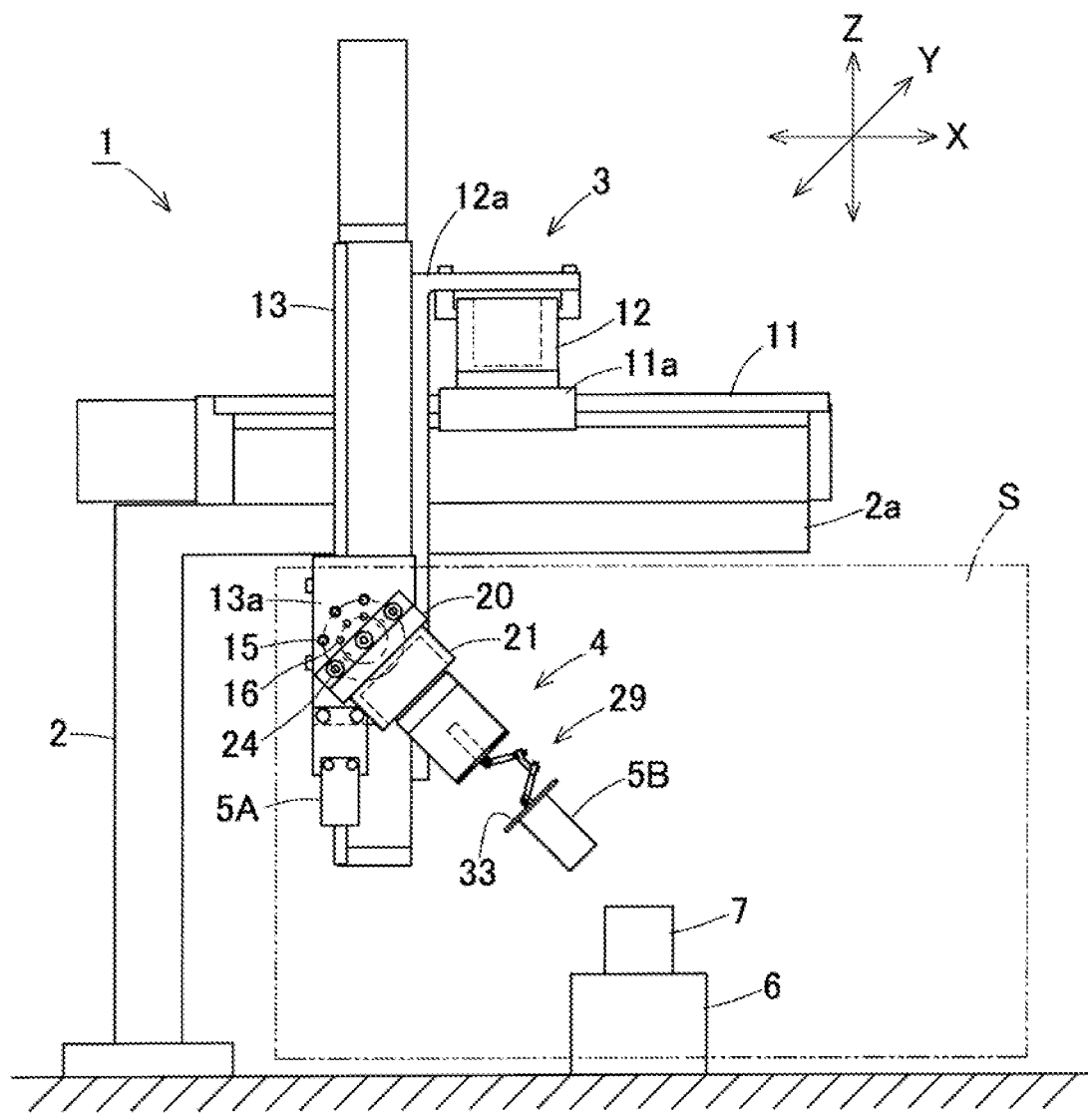
FIG. 4 is a front view showing a schematic configuration of a working device according to a second embodiment of the present invention.

FIG. 4 to FIG. 9 show a second embodiment of the present invention. As shown in FIG. 4, in the working device 1, the rotary unit 4 includes a first rotating mechanism 21, that is a rotating mechanism having one degree of freedom, and a second rotating mechanism composed of a link actuation device 29 having two degrees of freedom. That is, the second rotating mechanism 22 and the third rotating mechanism 23 in the first embodiment (see FIG. 1) are replaced with the link actuation device 29. The other configuration is the same as in the first embodiment. The first rotating mechanism 21 forms "another rotating mechanism" which rotates the link actuation device 29 about a central axis of a proximal end side link hub.

Figure 5:
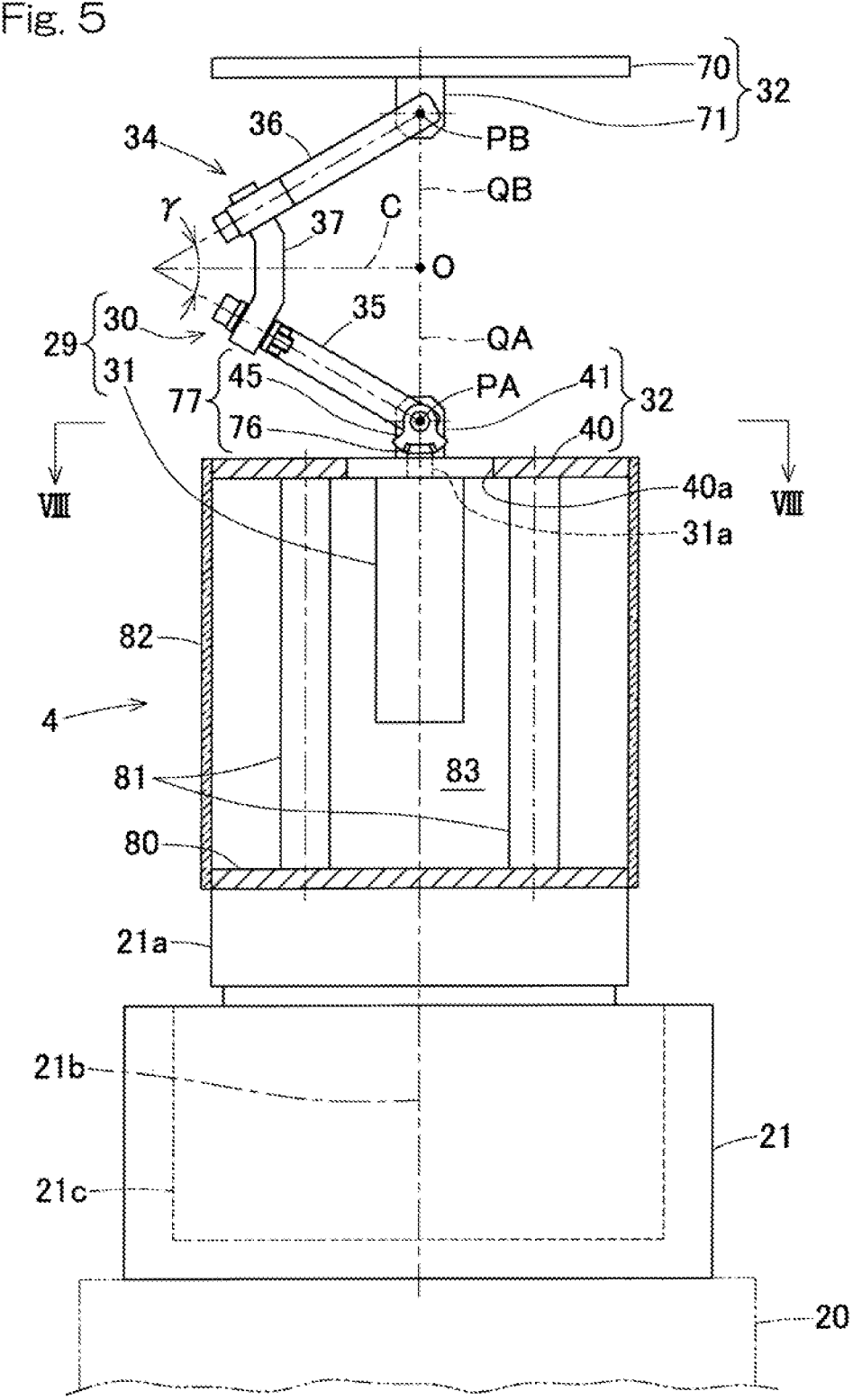
FIG. 5 is a front view representing a part of a rotary unit of the working device in a cross-section.
Figure 6:
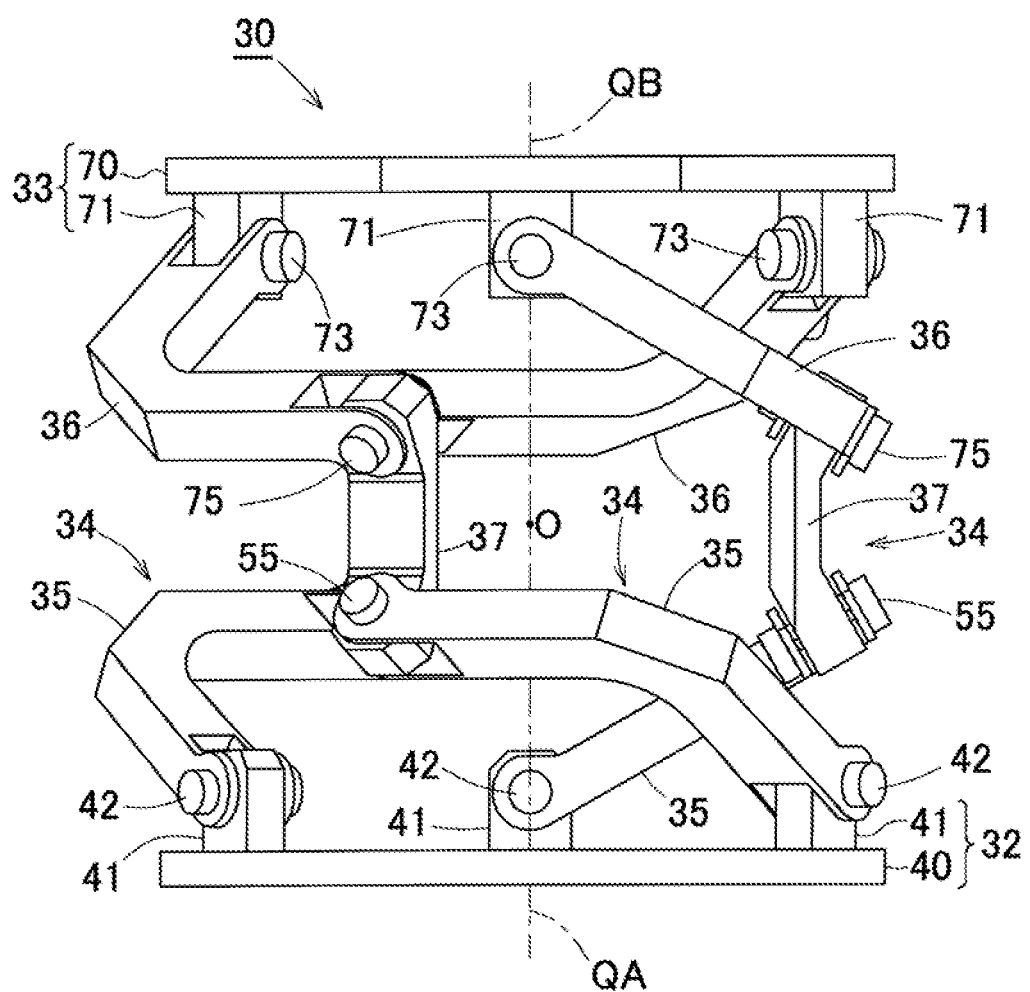
FIG. 6 is a perspective view of a parallel link mechanism of a link actuation device of the rotary unit.
Figure 7:
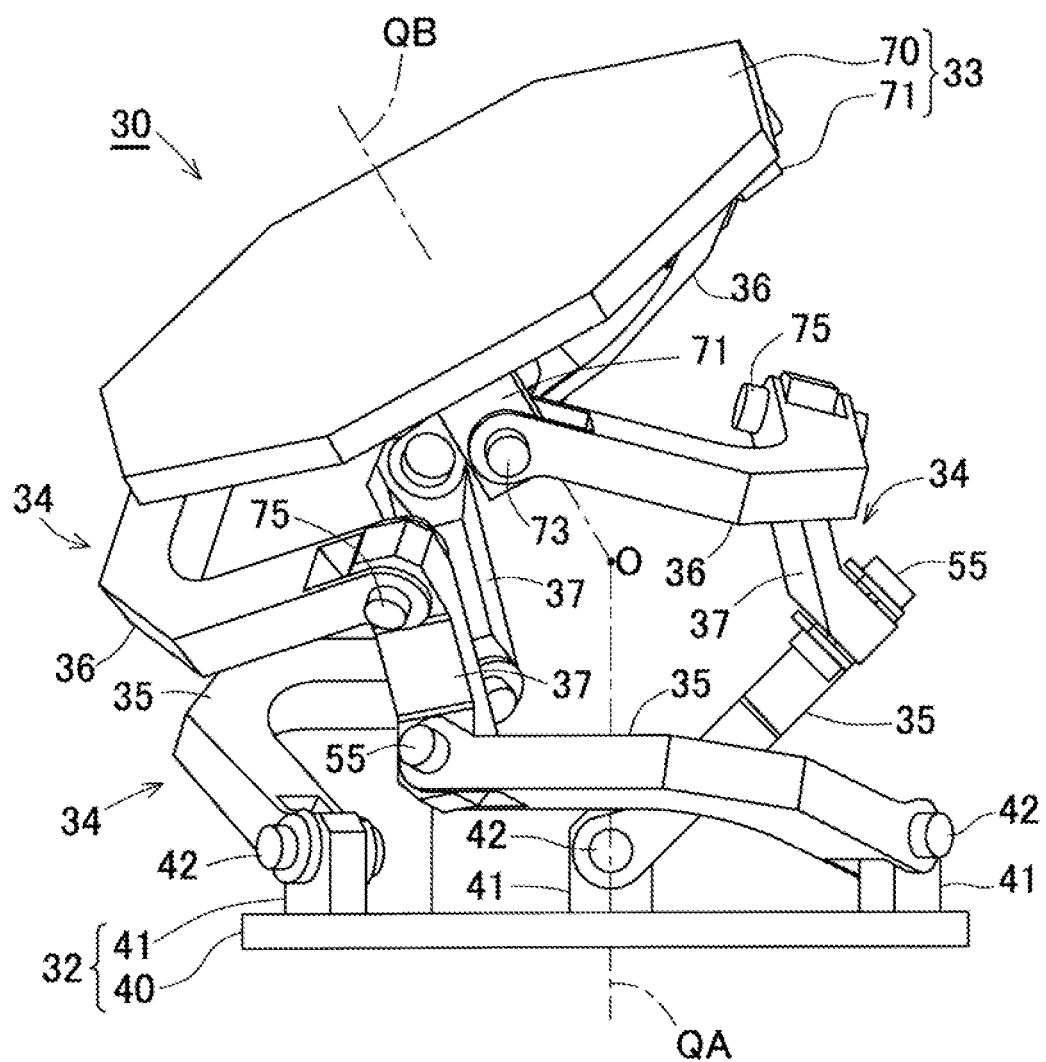
FIG. 7 is a perspective view of a different state of the parallel link mechanism.

As shown in FIG. 5, the link actuation device 29 includes a parallel link mechanism 30 and posture control actuators 31 that operate the parallel link mechanism 30. FIG. 6 and FIG. 7 are perspective views in which only the parallel link mechanism 30 is taken out and is represented, and show different states of the parallel link mechanism 30. As shown in FIG. 5 to FIG. 7, the parallel link mechanism 30 is configured such that a distal end side link hub 33 is coupled to a proximal end side link hub 32 via three link mechanisms 34 such that the posture of the distal end side link hub 33 can be changed relative to the proximal end side link hub 32. FIG. 5 shows only one link mechanism 34. The number of link mechanisms 34 may be four or more.

Each link mechanism 34 includes a proximal side end link member 35, a distal side end link member 36, and an intermediate link member 37, and forms a quadric chain link mechanism composed of four revolute pairs. The proximal side and distal side end link members 35 and 36 each have an L-shape. The proximal side end link member 35 has one end rotatably coupled to the proximal end side link hub 32, and the distal side end link member 36 has one end rotatably coupled to the distal end side link hub 33. The intermediate link member 37 has opposite ends rotatably coupled to the other ends of the proximal side and distal side end link members 35 and 36, respectively.

The parallel link mechanism 30 is formed by combining two spherical link mechanisms, and the central axes of the revolute pairs between the link hubs 32 and 33 and the end link members 35 and 36 and the central axes of the revolute pairs between the end link members 35 and 36 and the intermediate link members 37 intersect each other at spherical link centers PA and PB (FIG. 5) at the proximal end side and the distal side, respectively. In addition, at the proximal end side and the distal end side, the distances from the spherical link centers PA and PB to the revolute pairs between the link hubs 32 and 33 and the end link members 35 and 36 are equal to each other, and the distances from the spherical link centers PA and PB to the revolute pairs between the end link members 35 and 36 and the intermediate link members 37 are also equal to each other. The central axes of the revolute pairs between the end link members 35 and 36 and the intermediate link member 37 may form a certain cross angle γ (FIG. 5), or may be parallel to each other.

Figure 8:
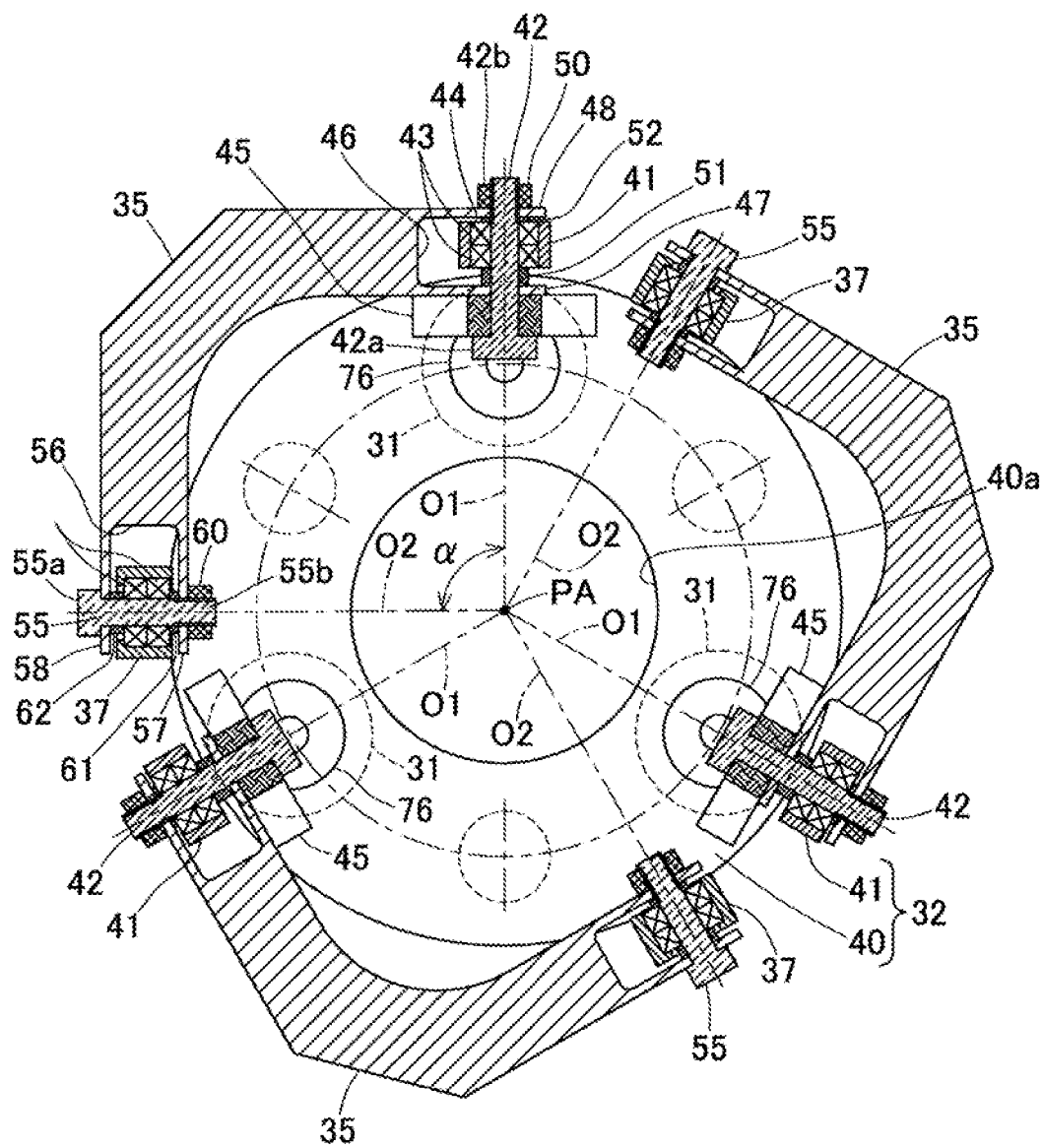
FIG. 8 is a cross-sectional view taken along a line VIII-VIII in FIG. 5.

FIG. 8 is a cross-sectional view taken along a line VIII-VIII in FIG. 5. FIG. 8 shows a relationship between the central axes O1 of the revolute pairs between the proximal end side link hub 32 and the proximal side end link members 35, the central axes O2 of the revolute pairs between the intermediate link members 37 and the proximal side end link members 35, and the proximal end side spherical link center PA. Specifically, the point at which the central axes O1 and the central axes O2 intersect each other is the spherical link center PA. The shapes and the positional relationship of the distal end side link hub 33 and the distal side end link members 36 are the same as in FIG. 8 (not shown). In the shown example, the angle α formed by the central axis O1 of each revolute pair between the link hub 32 (33) and the end link member 35 (36) and the central axis O2 of the revolute pair between the end link member 35 (36) and the intermediate link member 37 is set at 90°. However, the angle α may be an angle other than 90°.

Figure 9:
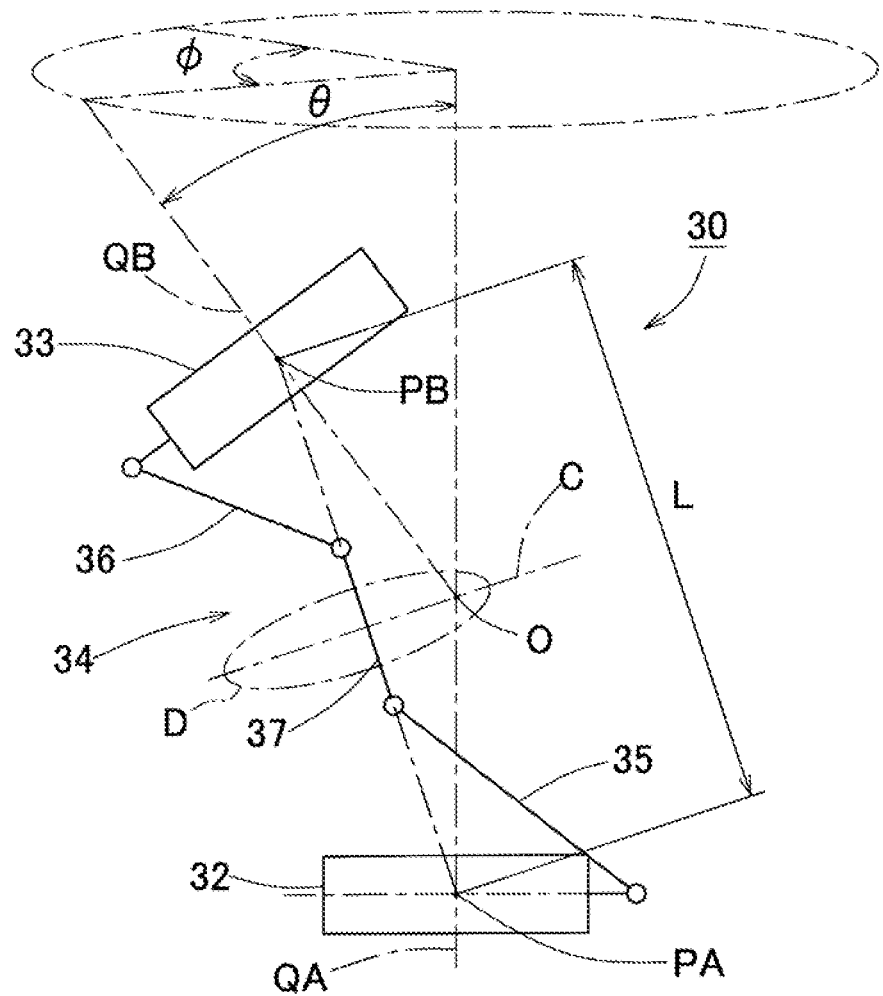
FIG. 9 is a diagram representing one link mechanism of the link actuation device with straight lines.

The three link mechanisms 34 have a geometrically identical configuration. The geometrically identical configuration means that, as shown in FIG. 9, a geometric model depicted with straight lines representing the link members 35, 36, and 37, that is, a model depicted with the revolute pairs and straight lines connecting these revolute pairs, represents a shape in which a proximal end side portion and a distal end side portion are symmetrical with each other with respect to the center portion of the intermediate link member 37. FIG. 9 is a diagram representing one link mechanism 34 with straight lines. The parallel link mechanism 30 of this embodiment is of a rotation symmetrical type, and has a positional configuration in which the positional relationship between a proximal side region, composed of the proximal end side link hub 32 and the proximal side end link member 35, and a distal side region, composed of the distal end side link hub 33 and the distal side end link member 36, has rotation symmetry relative to a center line C of the intermediate link member 37. The center portion of each intermediate link member 37 is located on a common orbital circle D.

The proximal end side link hub 32, the distal end side link hub 33, and the three link mechanisms 34 cooperate together to form a two-degrees-of-freedom mechanism in which the distal end side link hub 33 is rotatable about two mutually orthogonal axes relative to the proximal end side link hub 32. In other words, the two-degrees-of-freedom mechanism allows the distal end side link hub 33 to rotate with two degrees of freedom to change its posture, relative to the proximal end side link hub 32. This two-degrees-of-freedom mechanism is compact in size, but can achieve a wide range of movement for the distal end side link hub 33 relative to the proximal end side link hub 32.

For example, when straight lines that pass through the spherical link centers PA and PB and intersect the central axes O1 (FIG. 8) of the respective revolute pairs between the link hubs 32 and 33 and the end link members 35 and 36 at a right angle are defined as central axes QA and QB of the link hubs 32 and 33, the maximum value of a bending angle θ (FIG. 9) between the central axis QA of the proximal end side link hub 32 and the central axis QB of the distal end side link hub 33 can be about ±90°. A turning angle φ (FIG. 9) of the distal end side link hub 33 relative to the proximal end side link hub 32 can be set in the range of 0° to 360°. The bending angle θ means a vertical angle formed when the central axis QB of the distal end side link hub 33 is inclined relative to the central axis QA of the proximal end side link hub 32. The turning angle φ means a horizontal angle formed when the central axis QB of the distal end side link hub 33 is inclined relative to the central axis QA of the proximal end side link hub 32.

The posture of the distal end side link hub 33 relative to the proximal end side link hub 32 is changed with the point of intersection O between the central axis QA of the proximal end side link hub 32 and the central axis QB of the distal end side link hub 33 as a rotation center. FIG. 6 shows a state where the central axis QA of the proximal end side link hub 32 and the central axis QB of the distal end side link hub 33 are on the same line. FIG. 7 shows a state where the central axis QB of the distal end side link hub 33 forms a certain operating angle relative to the central axis QA of the proximal end side link hub 32. Even when the posture is changed, the distance L (FIG. 9) between the proximal end side and distal end side spherical link centers PA and PB does not change.

When each link mechanism 34 satisfies the following respective conditions 1 to 5, the proximal side region, composed of the proximal end side link hub 32 and the proximal side end link member 35, and the distal side region, composed of the distal end side link hub 33 and the distal side end link member 36, move simultaneously due to the geometrical symmetry. Thus, when rotation is transmitted from the proximal end side to the distal end side, the parallel link mechanism 30 serves as a constant velocity universal joint in which the proximal end side and the distal end side are rotated by the same angle and at equal speeds.

Condition 1: The angles and the lengths of the central axes O1 of the revolute pairs between the link hubs 32 and 33 and the end link members 35 and 36 in each link mechanism 34 are equal to each other.

Condition 2: The central axes O1 of the revolute pairs between the link hubs 32 and 33 and the end link members 35 and 36 and the central axes O2 of the revolute pairs between the end link members 35 and 36 and the intermediate link member 37 intersect each other at the spherical link centers PA and PB at the proximal end side and the distal end side.

Condition 3: The geometrical shapes of the proximal side end link member 35 and the distal side end link member 36 are the same.

Condition 4: The geometrical shapes of the proximal end side portion and the distal end side portion of the intermediate link member 37 are the same.

Condition 5: The angular positional relationships between the intermediate link member 37 and the end link members 35 and 36 with respect to the symmetry plane of the intermediate link member 37 are identical between the proximal end side and the distal end side.

As shown in FIG. 5 to FIG. 7, the proximal end side link hub 32 includes a proximal end member 40 and three rotation shaft coupling members 41 provided so as to be integrated with the proximal end member 40. As shown in FIG. 8, the proximal end member 40 has a circular through hole 40a defined in a center portion thereof, and the three rotation shaft coupling members 41 are disposed equidistantly in the circumferential direction around the through hole 40a. The center of the through hole 40a is located on the central axis QA (FIG. 5) of the proximal end side link hub 32. A rotation shaft 42 having an axis that intersects the central axis QA of the proximal end side link hub 32 is rotatably coupled to each rotation shaft coupling member 41. One end of the proximal side end link member 35 is coupled to the rotation shaft 42.

As shown in FIG. 8, the rotation shaft 42 is rotatably supported by the rotation shaft coupling member 41 via two bearings 43. Each bearing 43 is a ball bearing such as a deep groove ball bearing and an angular contact ball bearing. These bearings 43 are mounted in a radially inner hole 44 provided in the rotation shaft coupling member 41, in a state of being fitted therein, and are fixed by a method such as press-fitting, adhesion, and crimping. The same also applies to the type of and a mounting method for bearings provided to the other revolute pair sections.

The one end of the proximal side end link member 35 and a sector-shaped bevel gear 45 (described later) are connected to the rotation shaft 42 so as to be rotatable integrally with the rotation shaft 42. Specifically, a cut portion 46 is formed at the one end of the proximal side end link member 35, and the rotation shaft coupling member 41 is disposed between inner and outer rotation shaft support portions 47 and 48 that form both side portions of the cut portion 46. The bevel gear 45 is disposed in contact with the inner surface of the rotation shaft support portion 47 on the inner side thereof. The rotation shaft 42 is inserted into a through hole formed in the bevel gear 45, a through hole formed in the inner rotation shaft support portion 47, hollows of the inner rings of the bearings 43, and a through hole formed in the outer rotation shaft support portion 48, in this order, from the inner side. Then, the bevel gear 45, the inner and outer rotation shaft support portions 47 and 48 and the inner rings of the bearings 43 are sandwiched to be held between a head portion 42a of the rotation shaft 42 and a nut 50 screwed onto a threaded portion 42b of the rotation shaft 42, so as to be connected to each other. Spacers 51 and 52 are interposed between the inner and outer rotation shaft support portions 47 and 48 and the bearings 43, and a preload is applied to the bearings 43 at the time of screwing the nut 50.

A rotation shaft 55 is connected to the other end of the proximal side end link member 35. The rotation shaft 55 is rotatably coupled to one end of the intermediate link member 37 via two bearings 53. Specifically, a cut portion 56 is formed at the other end of the proximal side end link member 35, and the one end of the intermediate link member 37 is disposed between inner and outer rotation shaft support portions 57 and 58 that form both side portions of the cut portion 56. The rotation shaft 55 is inserted into a through hole formed in the outer rotation shaft support portion 58, hollows of the inner rings of the bearings 53, and a through hole formed in the inner rotation shaft support portion 57, in this order, from the outer side. Then, the inner and outer rotation shaft support portions 57 and 58 and the inner rings of the bearings 53 are sandwiched to be held between a head portion 55a of the rotation shaft 55 and a nut 60 screwed onto a threaded portion 55b of the rotation shaft 55, so as to be connected to each other. Spacers 61 and 62 are interposed between the inner and outer rotation shaft support portions 57 and 58 and the bearings 53, and a preload is applied to the bearings 53 at the time of screwing the nut 60.

As shown in FIG. 6 and FIG. 7, the distal end side link hub 33 includes a distal end member 70 and three rotation shaft coupling members 71 provided equidistantly in the circumferential direction on the inner surface of the distal end member 70. The center of the circle having the circumference on which the respective rotation shaft coupling members 71 are disposed is located on the central axis QB of the distal end side link hub 33. A rotation shaft 73 having an axis that intersects the link hub central axis QB is rotatably coupled to each rotation shaft coupling member 71. One end of the distal side end link member 36 is coupled to the rotation shaft 73 defined at the distal end side link hub 33. A rotation shaft 75 is rotatably coupled to the other end of the intermediate link member 37 and is coupled to the other end of the distal side end link member 36. Similar to the above rotation shafts 42 and 55, the rotation shaft 73 defined at the distal end side link hub 33 and the rotation shaft 75 defined at the intermediate link member 37 are rotatably coupled to the other ends of the rotation shaft coupling member 71 and the intermediate link member 37, respectively, via two bearings (not shown).

As shown in FIG. 5, the proximal end member 40 is coupled to a base member 80 via a plurality of shafts 81, whereby the parallel link mechanism 30 is mounted on the first rotating mechanism 21. The central axis QA of the proximal end side link hub 32 and the rotation axis 21b of the first rotating mechanism 21 are located on the same line. The base member 80 is fixed to the rotating portion 21a of the first rotating mechanism 21. A cover 82 is attached between the outer circumferential edge of the proximal end member 40 and the outer circumferential edge of the base member 80, and a shielded space 83 shielded from the outside is formed between the proximal end member 40 and the base member 80.

The posture control actuators 31, which operate the parallel link mechanism 30, are disposed within the shielded space 83 and are mounted on the proximal end member 40. The number of the posture control actuators 31 is three, which is equal to the number of the link mechanisms 34. Each posture control actuator 31 is composed of a rotary actuator such as a motor, and a bevel gear 76 mounted on a rotation output shaft 31a of the posture control actuator 31 and the above-described sector-shaped bevel gear 45 mounted on the rotation shaft 42 at the proximal end side link hub 32 are in mesh with each other. The bevel gear 76 and the sector-shaped bevel gear 45 cooperate together to form an axis-orthogonal type speed reducer 77. An axis-orthogonal type speed reducer may be formed by using another mechanism that is not a bevel gear (for example, a worm mechanism).

In this example, the posture control actuators 31, the number of which is equal to that of the link mechanisms 34, are provided. However, when the posture control actuators 31 are provided to two of the three link mechanisms 34, the posture of the distal end side link hub 33 relative to the proximal end side link hub 32 can be determined.

The link actuation device 29 operates the parallel link mechanism 30 by rotationally driving each posture control actuator 31. Specifically, when each posture control actuator 31 is rotationally driven, the rotation of the posture control actuator 31 is transmitted to the rotation shaft 42 via the axis-orthogonal type speed reducer 77 while reducing the speed of the rotation, and the angle of the proximal side end link member 35 relative to the proximal end side link hub 32 is changed. Accordingly, the position and the posture of the distal end side link hub 33 relative to the proximal end side link hub 32 are determined. Since the central axis QA of the proximal end side link hub 32 and the rotation axis 21b of the first rotating mechanism 21 are located on the same line, coordinate calculation is easy.

When the central axis QA of the proximal end side link hub 32 and the rotation axis 21b of the first rotating mechanism 21 are located on the same line, the operator easily imagines operation of the working device 1, and thus can easily manipulate the working device 1. For example, work can be performed, while the posture of the end effector 5B is being changed, by: fixing the positions of three degrees of freedom determined by the linear motion unit 3; fixing the angles of two degrees of freedom of the angles out of the three degrees of freedom determined by the rotary unit 4; and changing only the angle of the remaining one degree of freedom (for example, an angle about the central axis QB of the distal end side link hub 33).

As described above, the link actuation device 29 can smoothly operate in a wide range of movement. Thus, when the rotary unit 4 includes the link actuation device 29, fine work can be performed at a high speed. In addition, the link actuation device 29 has a compact configuration but has a wide range of movement, and thus, the entire configuration of the working device 1 becomes compact.

When the first rotating mechanism 21 is disposed at the proximal end side of the link actuation device 29 and the end effector 5B is mounted on the distal end side link hub 33 as in this embodiment, a load on the link actuation device 29 can be reduced, and therefore, the link actuation device 29 can be made compact and can be reduced in weight. The parallel link mechanism 30 of the link actuation device 29 is configured as a constant velocity universal joint. Thus, by cooperative control of the link actuation device 29 and the first rotating mechanism 21, work can be easily performed, while the posture of the end effector 5B is being changed, by changing only the angle of the distal end side link hub 33 about the central axis QB. However, it is necessary to take into consideration cables connected to each posture control actuator 31, and thus, the rotation angle is limited.

Figure 10:
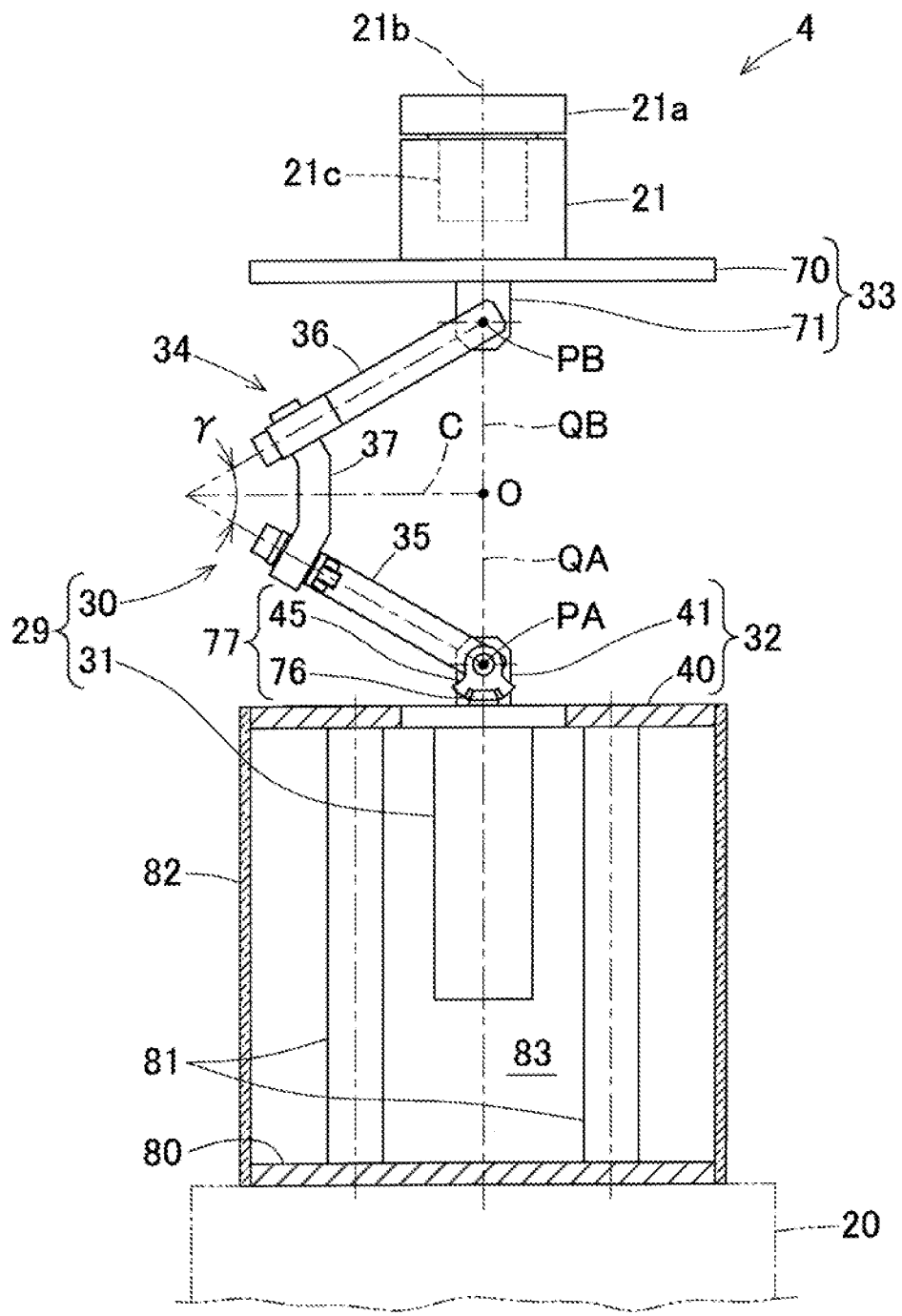
FIG. 10 is a front view of a different rotary unit.

FIG. 10 shows a rotary unit 4 in which alignment of the first rotating mechanism 21 and the link actuation device 29 is inverted from that in the configuration in FIG. 5. In this case, the central axis QB of the distal end side link hub 33 of the link actuation device 29 and the rotation axis 21b of the first rotating mechanism 21 are located on the same line. The other configuration is the same as that in FIG. 5.

With the configuration of the rotary unit 4 shown in FIG. 10, it is easy to arrange cables connected to the posture control actuators 31, and the rotation angle is less likely to be limited. On the other hand, there is a drawback that a load on the link actuation device 29 increases. Other than this, the same operation and advantageous effects as in the configuration in FIG. 5 are achieved.

Third Embodiment

Figure 11:
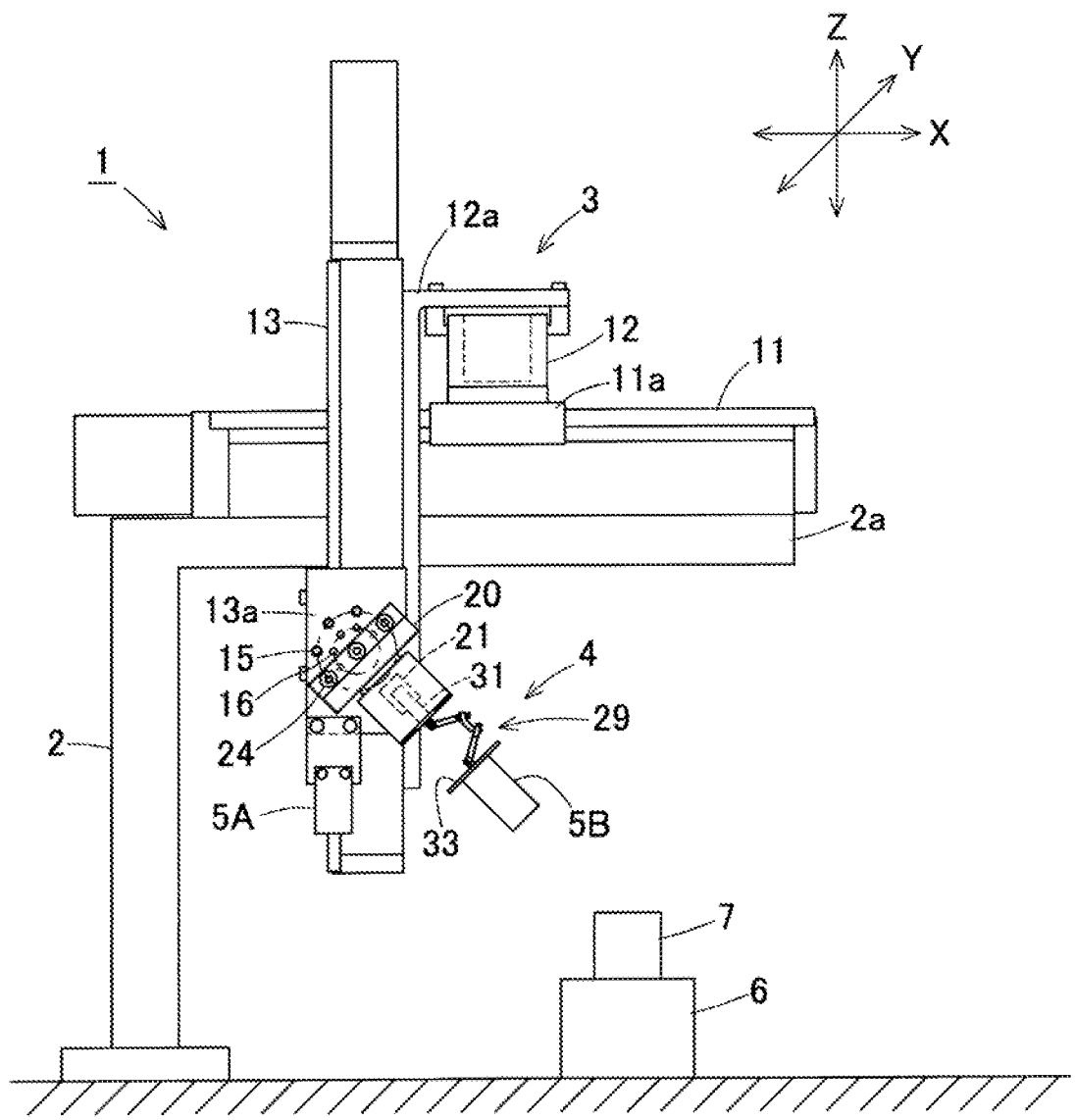
FIG. 11 is a diagram showing a schematic configuration of a working device according to a third embodiment of the present invention.
Figure 12:
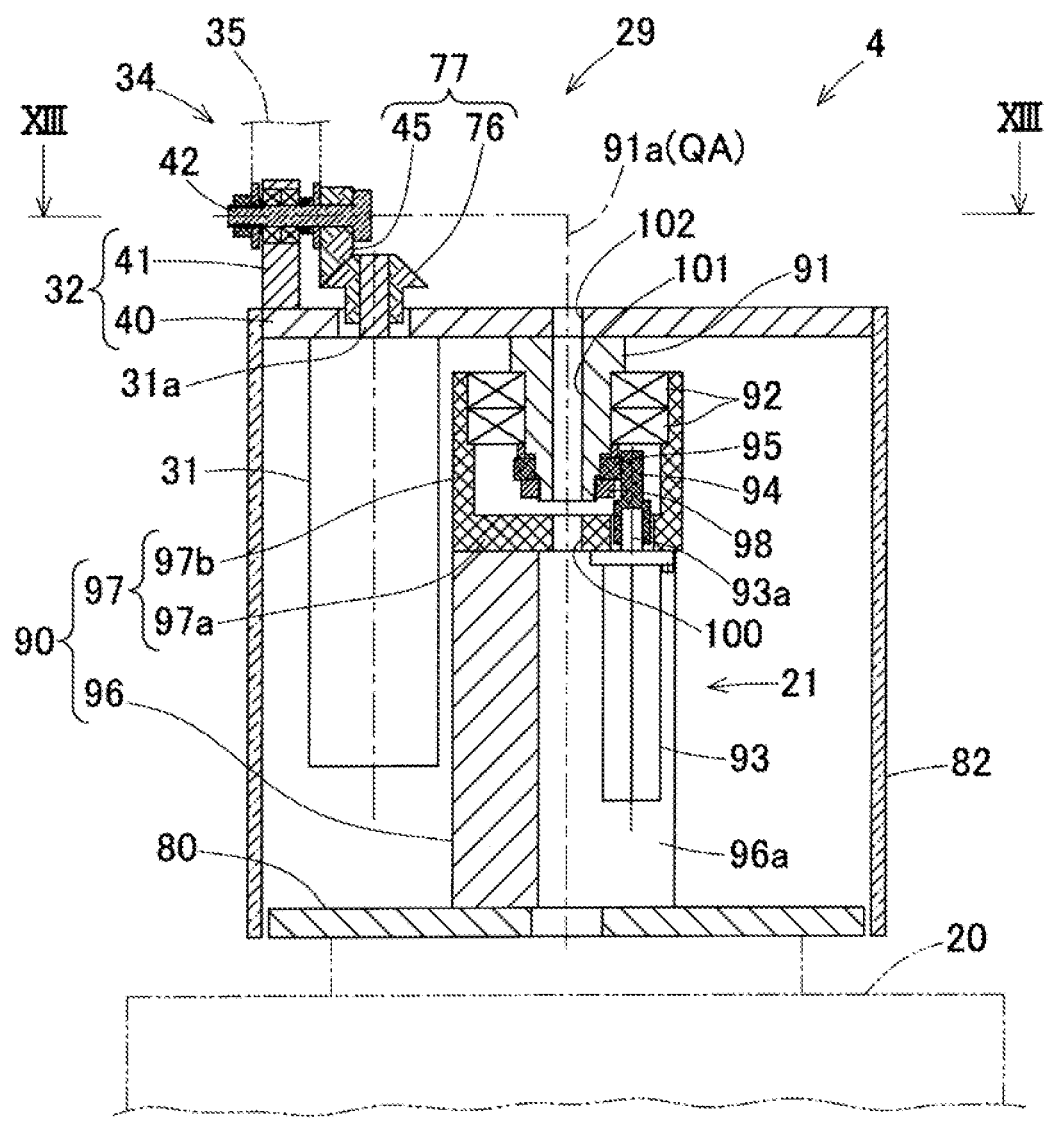
FIG. 12 is a front view of a main part of a rotary unit of the working device.
Figure 13:
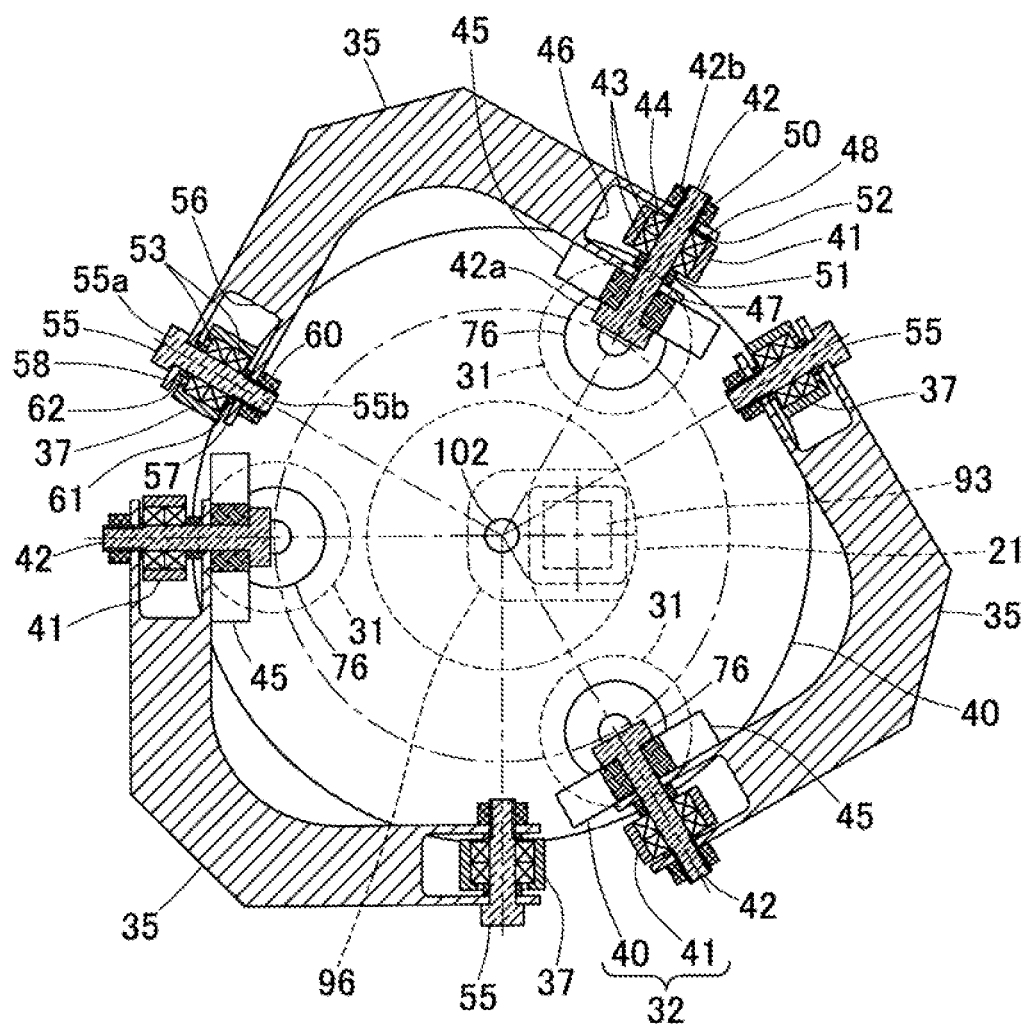
FIG. 13 is a cross-sectional view taken along a line XIII-XIII in FIG. 12.

FIG. 11 to FIG. 13 show a third embodiment of the present invention. As shown in FIG. 11, in this working device 1 as well, similar to the second embodiment (see FIG. 4), the rotary unit 4 includes a first rotating mechanism 21 that is a rotating mechanism having one degree of freedom, and a link actuation device 29 that is a rotating mechanism having two degrees of freedom. The working device 1 of the third embodiment is different from that of the second embodiment in that the first rotating mechanism 21 is disposed at a center portion of the posture control actuators 31 of the link actuation device 29.

As shown in FIG. 12, the first rotating mechanism 21 includes: a fixed portion 90 that is fixed to the base member 80; a rotating portion 91 that is fixed to the proximal end member 40 of the link actuation device 29; two bearings 92 via which the rotating portion 91 is rotatably supported on the fixed portion 90; a motor 93 that is a drive source mounted on the fixed portion 90; and a pair of spur gears 94 and 95 that transmit rotation of the motor 93 to the rotating portion 91.

The base member 80 is fixed to the rotary unit mounting member 20. The fixed portion 90 includes: a first mounting member 96 that is fixed to the base member 80 and has a cross-section with a horseshoe shape shown in FIG. 13; and a second mounting member 97 that has a bottom portion 97a fixed to the first mounting member 96 and a tubular portion 97b extending from the outer circumferential edge of the bottom portion 97a in the upward direction in FIG. 12. The rotating portion 91 is fixed to the proximal end member 40 of the proximal end side link hub 32 such that the rotation axis 91a of the rotating portion 91 is located so as to be coaxial with the central axis QA of the proximal end side link hub 32. The two bearings 92 are disposed on the inner periphery of the tubular portion 97b of the second mounting member 97.

The motor 93 is disposed in a recess 96a of the first mounting member 96 having a cross-section with a horseshoe shape, and is fixed to the bottom portion 97a of the second mounting member 97. An output shaft 93a of the motor 93 extends upward, and penetrates the bottom portion 97a of the second mounting member 97. The spur gear 94 at the drive side is mounted on the upper end of the output shaft 93a. The spur gear 94 at the drive side is in mesh with the spur gear 95 at the driven side which is mounted on the rotating portion 91. The spur gear 95 at the driven side is fitted on the outer periphery of the rotating portion 91 and is fixed to the rotating portion 91 by a nut 98 screwed on a threaded portion that is provided at the lower end of the rotating portion 91.

Wiring holes 100, 101 and 102 are provided in the bottom portion 97a of the second mounting member 97, the rotating portion 91 and the proximal end member 40, respectively, so as to penetrate along the rotation axis 91a of the rotating portion 91. A cover 82 is attached to the outer circumferential edge of the proximal end member 40 so as to extend to the vicinity of the outer circumferential edge of the base member 80. The cover 82 and the base member 80 are not connected to each other.

Similar to the configuration in FIG. 5, the three posture control actuators 31 of the link actuation device 29 are disposed on the circumference of a virtual circle on the proximal end member 40, and rotational driving force of the rotation output shaft 31a of each posture control actuator 31 is transmitted via the axis-orthogonal type speed reducer 77 to the link mechanism 34. In the case where the posture control actuators 31 are disposed as described above, the first rotating mechanism 21 can be disposed at the center of arrangement of the posture control actuators 31 as in the third embodiment. Accordingly, the configuration of the rotary unit 4 becomes compact.

When the motor 93 is driven, the entire link actuation device 29 and the cover 82 rotate together with the rotating portion 91. By passing wires through the wiring holes 100, 101, and 102, the wires can be connected to the end effectors 5A and 5B through the internal space of the link actuation device 29 without interference with the link mechanism 34. Thus, limitations on wires such as cables connected to the posture control actuators 31 are reduced. The internal space of the link actuation device 29 refers to a space surrounded by the proximal end side link hub 32, the distal end side link hub 33 and each link mechanism 34.

Figure 14:
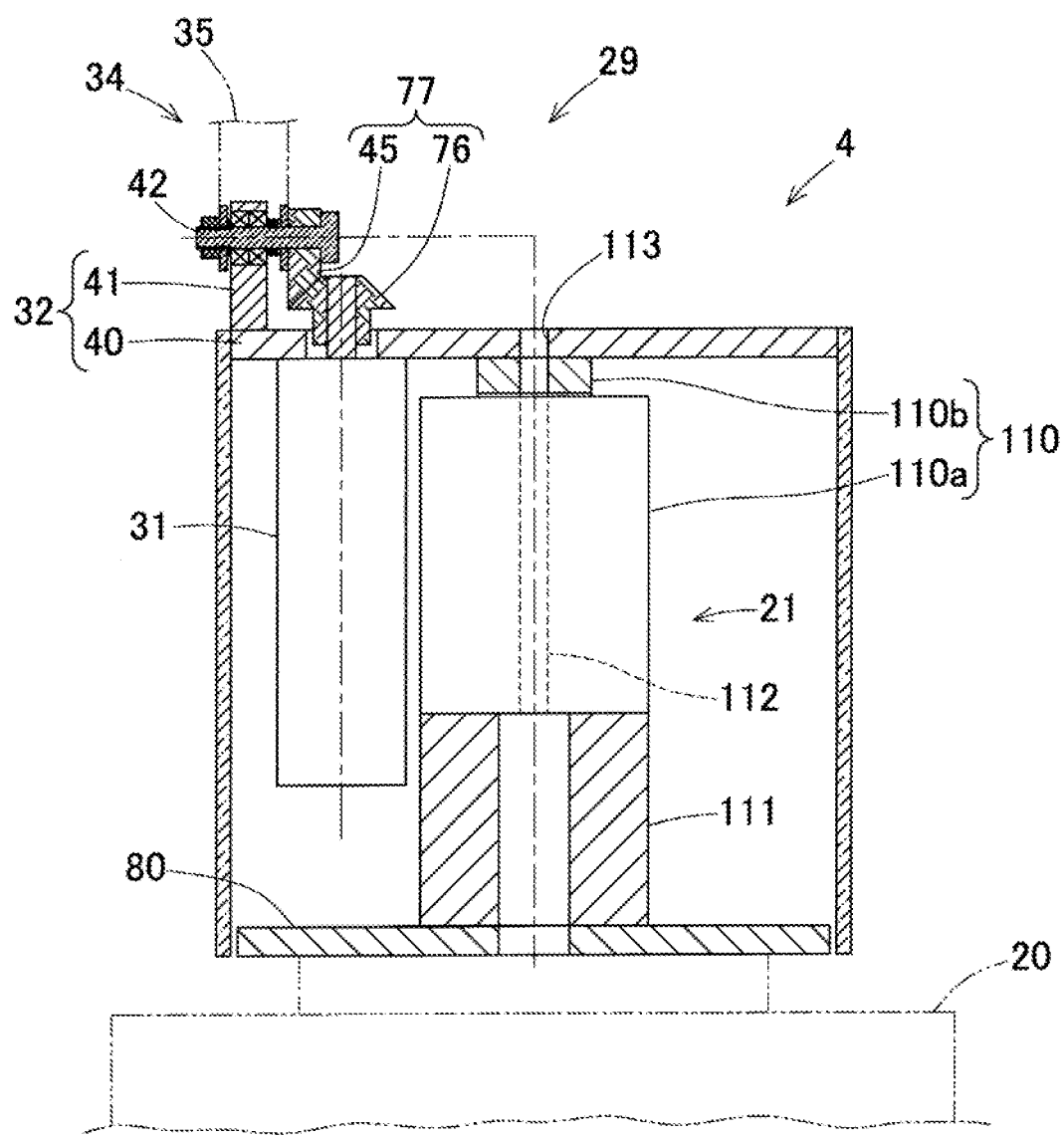
FIG. 14 is a front view of a main part of a different rotary unit.

FIG. 14 is a front view of a main part of a different type rotary unit. In the rotary unit 4 shown in FIG. 14, the first rotating mechanism 21 is disposed at a center portion of the respective posture control actuators 31 of the link actuation device 29. This point is the same as in the configuration shown in FIG. 12, but the drive source of the first rotating mechanism 21 shown in FIG. 14 is a hollow shaft motor 110 unlike the configuration shown in FIG. 12.

The hollow shaft motor 110 includes: a motor body 110a fixed to the base member 80 via a motor mounting member 111; and an output shaft 110b to which the proximal end member 40 of the proximal end side link hub 32 is fixed. The hollow shaft motor 110 has a wiring hole 112 that penetrates the motor body 110a and the output shaft 110b in the axial direction thereof. In addition, a wiring hole 113 is also provided in the proximal end member 40 of the proximal end side link hub 32 so as to be coaxial with the wiring hole 112. The other configuration is the same as the configuration shown in FIG. 12, and the same operation and advantageous effects as in the configuration shown in FIG. 12 are achieved.

[Double-Arm Type Working Device]

Figure 15:
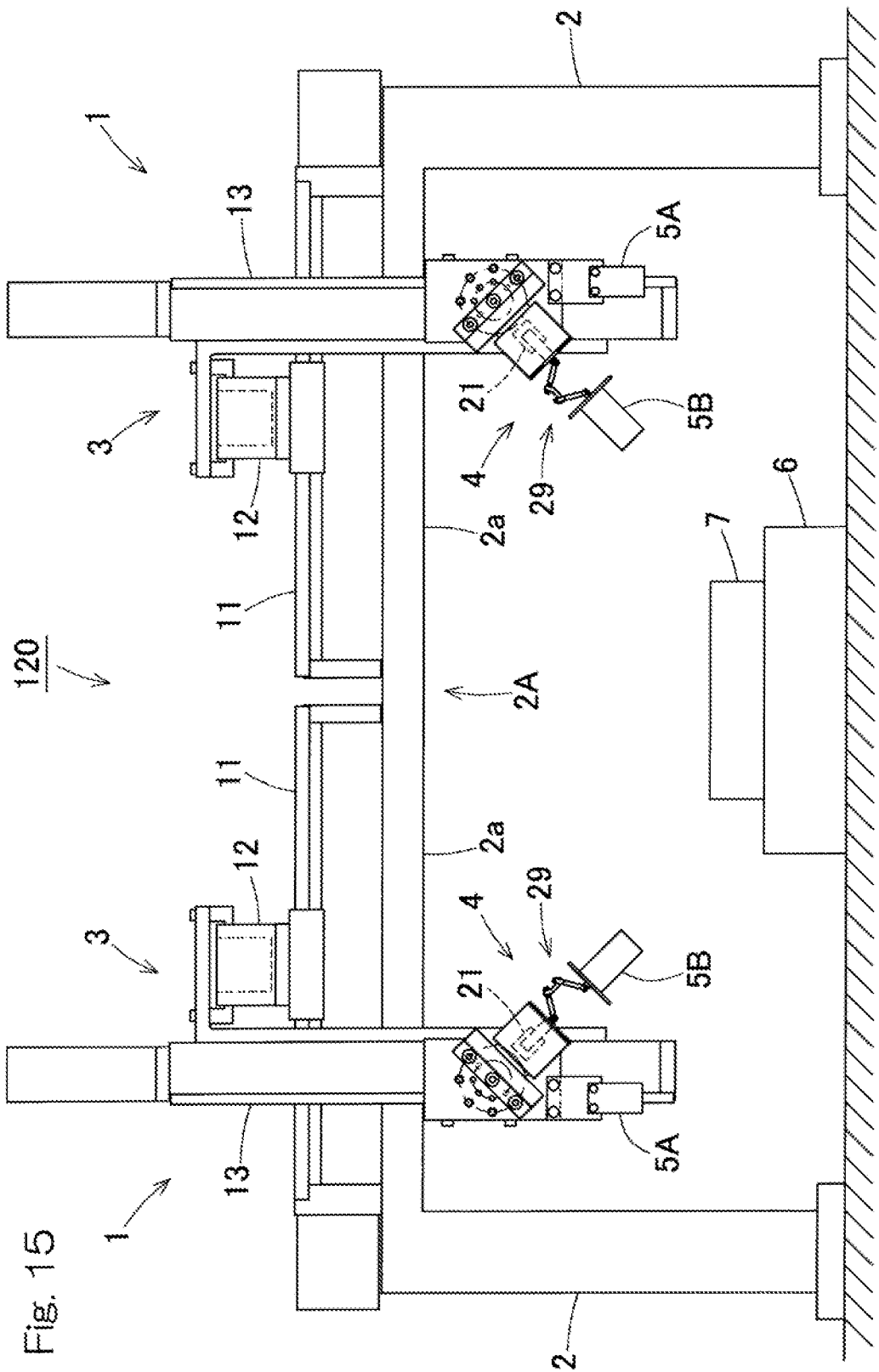
FIG. 15 is a front view showing a schematic configuration of a double-arm type working device according to a fourth embodiment of the present invention.

FIG. 15 is a front view showing a schematic configuration of a double-arm type working device according to a fourth embodiment of the present invention. In the double-arm type working device 120 shown in FIG. 15, two working devices 1 are aligned so as to be geometrically symmetrical with each other. The mounts 2, 2 of the respective working devices 1 are connected at tip ends of the horizontal portions 2a, 2a thereof to each other to form a gate-shaped mount 2A as a whole. In the fourth embodiment, the working device 1 of the third embodiment shown in FIG. 11 is used, but the working device of another embodiment may be used.

When a double-arm type in which the two working devices 1 are aligned as described above is configured, it is possible to perform work that is performed with both hands by a person. Accordingly, work that is performed as a substitute for a person, in particular, work such as assembly of components, can be performed. When the two working devices 1, 1 are installed on the gate-shaped mount 2A, a workpiece 7 to be worked on can be passed below the working devices 1, 1. For example, a workpiece placement table 6 is configured as a conveyor device capable of conveying the workpiece 7 in a direction orthogonal to the sheet of FIG. 15, and the working devices 1, 1 can be installed on a conveyor line of the conveyor device. In addition, the range of movement of the working devices 1, 1 in the widthwise direction can be limited to a range within the width of the mount 2A. Thus, the occupation area of the working devices 1, 1 can be reduced. Furthermore, since the range of movement of the working devices 1, 1 is limited, an operator can perform work at ease even when being present beside the working devices 1, 1.

Figure 16:
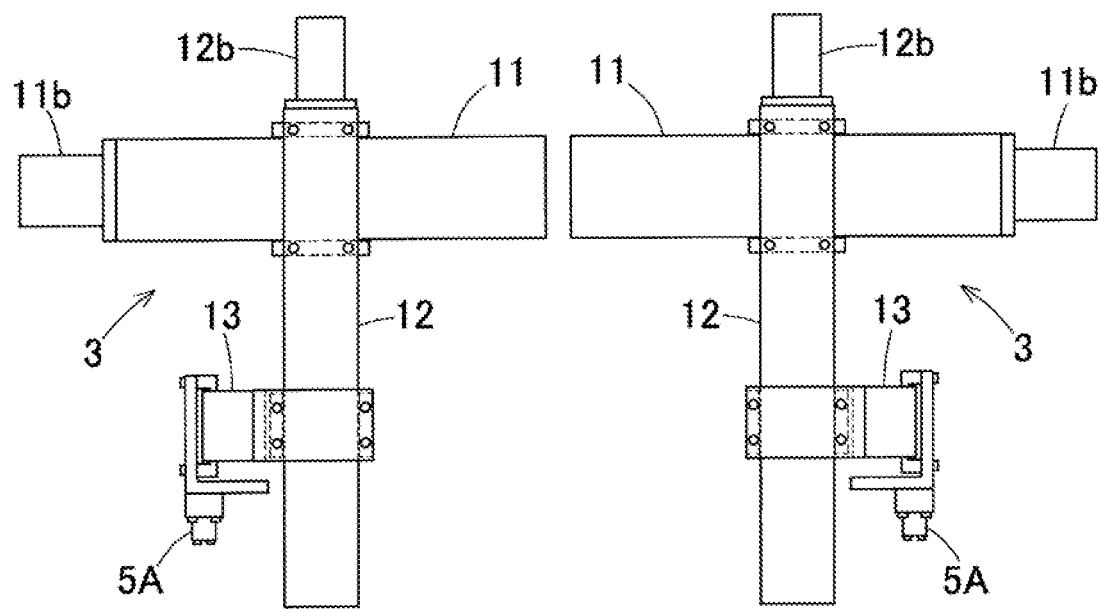
FIG. 16 is a plan view of a linear motion unit of the double-arm type working device.

FIG. 16 is a plan view of the linear motion units 3, 3 of the double-arm type working device 120 shown in FIG. 15. In each of these linear motion units 3, 3, similar to the linear motion unit 3 of each of the working devices 1 shown in the first embodiment (see FIG. 1), the second embodiment (see FIG. 4) and the third embodiment (see FIG. 11), the respective motors 11b and 12b of the first linear motion actuator 11 and the second linear motion actuator 12 are disposed on the central axes of the linear motion actuators 11 and 12.

Figure 17:
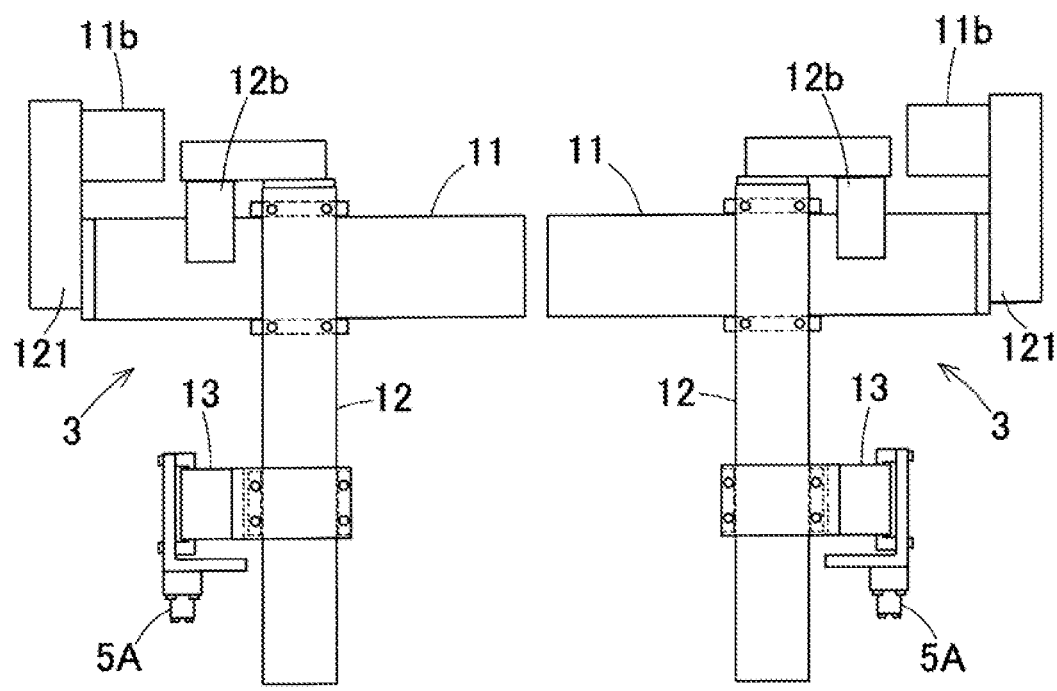
FIG. 17 is a plan view of a different linear motion unit.

FIG. 17 is a plan view showing another form of the linear motion units 3, 3. In each of these linear motion units 3, 3 shown in FIG. 17, the respective motors 11b and 12b of the first linear motion actuator 11 and the second linear motion actuator 12 are disposed so as to be displaced from the central axes of the linear motion actuators 11 and 12, and rotations of the motors 11b and 12b are transmitted to drive portions of the linear motion actuators 11 and 12 via power transmission means 121 such as chains.

Each linear motion unit 3 can be changed to the form shown in FIG. 16 or the form shown in FIG. 17 according to the specifications of the double-arm type working device 120. Since the linear motion units 3 and the rotary units 4 are separately provided, such form change is easy.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . working device
2 . . . mount
3 . . . linear motion unit
4 . . . rotary unit
5A, 5B . . . end effector
11 . . . first linear motion actuator
12 . . . second linear motion actuator
13 . . . third linear motion actuator
13a . . . output portion of linear motion unit
20 . . . rotary unit mounting member (base portion of rotary unit)
21 . . . first rotating mechanism
22 . . . second rotating mechanism
23 . . . third rotating mechanism
23a . . . output portion of rotary unit
29 . . . link actuation device
31 . . . posture control actuator
32 . . . proximal end side link hub
33 . . . distal end side link hub
34 . . . link mechanism
35 . . . proximal side end link member
36 . . . distal side end link member
37 . . . intermediate link member
120 . . . double-arm type working device
O1 . . . central axis of revolute pair between link hub and end link member
O2 . . . central axis of revolute pair between end link member and intermediate link member
PA, PB . . . spherical link center
QA, QB . . . central axis of link hub
S . . . working space

What is claimed is:

1. A working device having six degrees of freedom and configured to perform work using first and second end effectors, the working device comprising:

a linear motion unit having three degrees of freedom and obtained by combining three linear motion actuators, including a first linear motion actuator having a stage configured to advance and retract in a first direction, a second linear motion actuator having a stage configured to advance and retract in a second direction, and a third linear motion actuator having a stage configured to advance and retract in a third direction; and a rotary unit having three degrees of freedom and obtained by combining a plurality of rotating mechanisms each having one or more rotational degrees of freedom, wherein the linear motion unit is mounted on a mount such that a base portion of the first linear motion actuator is fixed to the mount, the second linear motion actuator is mounted on the first linear motion actuator, the third linear motion actuator is mounted on the second linear motion actuator, a base portion of the rotary unit is fixedly mounted on the stage of the third linear motion actuator; and the first end effector is mounted on the stage of the third linear motion actuator and the second end effector is mounted on an output portion of the rotary unit.

2. The working device as claimed in claim 1, wherein at least one of the plurality of rotating mechanisms of the rotary unit is a link actuation device having two degrees of freedom, the link actuation device including:

a proximal end side link hub, a distal end side link hubs, three or more link mechanisms via which the distal end side link hub is coupled to the proximal end side link hub such that a posture of the distal end side link hub can be changed relative to the proximal end side link hub, each link mechanism including:

a proximal side end link member having one end rotatably coupled to the proximal end side link hub, a distal side end link member having one end rotatably coupled to the distal end side link hub, and an intermediate link member having opposite ends rotatably coupled to other ends of the proximal side and distal side end link members, respectively, and a posture control actuator configured to arbitrarily change the posture of the distal end side link hub relative to the proximal end side link hub is provided to each of two or more link mechanisms of the three or more link mechanisms.

3. The working device as claimed in claim 2, wherein when a point, at which a central axis of each of revolute pairs between the proximal end side link hub and the proximal side end link members and a central axis of each of revolute pairs between the proximal side end link members and the intermediate link members intersect each other, is referred to as a proximal end side spherical link center, and a straight line, that passes through the proximal end side spherical link center and intersects the central axis of each of the revolute pairs between the proximal end side link hub and the proximal side end link members at a right angle, is referred to as a central axis of the proximal end side link hub, the multiple posture control actuators of the link actuation device are rotary actuators and are disposed on a circumference of a virtual circle such that rotation output shafts of the rotary actuators are parallel to the central axis of the proximal end side link hub, rotational driving force of each rotation output shaft is transmitted to the link mechanism via an axis-orthogonal type speed reducer, and another rotating mechanism for rotating the link actuation device about the central axis of the proximal end side link hub is disposed at a center of arrangement of the respective posture control actuators.

4. The working device as claimed in claim 2, wherein a first cut portion is formed at the one end of the proximal side end link member, and a rotation shaft coupling member of the proximal end side link hub is disposed between inner and outer rotation shaft support portions that form opposite side portions of the first cut portion, and a second cut portion is formed at the other end of the proximal side end link member, and one end of the intermediate link member is disposed between inner and outer rotation shaft support portions that form opposite side portions of the second cut portion.

5. The working device as claimed in claim 1, wherein each of the stages of the first to third linear motion actuators is disposed so as to be directed toward an outer side with respect to a working space in which work is performed by the first and second end effectors.

6. A double-arm type working device comprising:

two working devices, each of which is the working device as claimed in claim 1, wherein the two working devices are aligned so as to be geometrically symmetrical with each other.

7. The working device as claimed in claim 1, wherein the base portion of the rotary unit and the first end effector are mounted on a same side of the stage of the third linear motion actuator.

8. The working device as claimed in claim 1, wherein the base portion of the rotary unit is a rotary unit mounting member, one end portion, with respect to the third direction, of the stage of the third linear motion actuator includes a plurality of holes to fix the rotary unit mounting member to the stage of the third linear motion actuator, and the second effector is mounted to the stage of the third linear motion actuator via a fixing member which is mounted to the other end portion, with respect to the third direction, of the stage of the third linear motion actuator.

9. The working device as claimed in claim 1, wherein at least one of the plurality of rotating mechanisms of the rotary unit is a link actuation device having two degrees of freedom, the link actuation device including:

a proximal end side link hub connected to another rotating mechanism among the plurality of rotating mechanisms of the rotary unit, a distal end side link hub corresponding to the output portion of the rotary unit and to which the second end effector is mounted on, and three or more link mechanisms via which the distal end side link hub is coupled to the proximal end side link hub such that a posture of the distal end side link hub can be changed relative to the proximal end side link hub.

10. The working device as claimed in claim 9, wherein the base portion of the rotary unit is a rotary unit mounting member, the another rotating mechanism is mounted to the rotary unit mounting member, has one degree of freedom, and is to rotate the link actuation device about a central axis of the proximal end side link hub, and the proximal end side link hub is connected to the another rotating mechanism via a base member which is fixed to a rotating portion of the another rotating mechanism.

11. The working device as claimed in claim 1, wherein the base portion of the rotary unit is mounted such that the mounting angle thereof relative to the stage of the third linear motion actuator is changeable.

12. A working device, comprising:
a linear motion unit having three degrees of freedom and including:
- a first linear motion actuator having a stage configured to advance and retract in a first direction,
- a second linear motion actuator having a stage configured to advance and retract in a second direction, and
- a third linear motion actuator having a stage configured to advance and retract in a third direction, wherein
the linear motion unit is mounted on a mount such that a base portion of the first linear motion actuator is fixed to the mount, the second linear motion actuator is mounted on the first linear motion actuator, and the third linear motion actuator is mounted on the second linear motion actuator, and
a first end effector is mountable on the stage of the third linear motion actuator, the stage of the third linear motion actuator being arranged at a portion away from the second linear motion actuator; and
a rotary unit having three degrees of freedom, the rotary unit including:
- a base portion fixedly mounted on the stage of the third linear motion actuator,
- an output portion to which a second end effector is mountable, and
- a plurality of rotating mechanisms, provided between the base portion and the output portion of the rotary unit, each having one or more rotational degrees of freedom.

* * * * *

UNITED STATES PATENT AND TRADEMARK OFFICE
CERTIFICATE OF CORRECTION

PATENT NO. : 11,130,225 B2
APPLICATION NO. : 16/402909
DATED : September 28, 2021
INVENTOR(S) : Isobe et al.

Page 1 of 1

It is certified that error appears in the above-identified patent and that said Letters Patent is hereby corrected as shown below:

In the Claims

Column 19, Line 23:
Claim 2, delete "hubs," and insert --hub,-- therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*